United States Patent
Tamaki

(10) Patent No.: US 7,211,908 B2
(45) Date of Patent: May 1, 2007

(54) MAGNETIC FLOATING DEVICE

(75) Inventor: Masayuki Tamaki, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/038,671

(22) Filed: Jan. 19, 2005

(65) Prior Publication Data

US 2005/0168086 A1    Aug. 4, 2005

(30) Foreign Application Priority Data

Jan. 20, 2004    (JP)    ............................. 2004-011326

(51) Int. Cl.
*H02K 41/00*    (2006.01)
*H02K 7/09*    (2006.01)

(52) U.S. Cl. ........................ 310/12; 310/13; 310/90.5
(58) Field of Classification Search ................ 310/100, 310/12, 13, 90.5
See application file for complete search history.

(56) References Cited

U.S. PATENT DOCUMENTS

| | | | | |
|---|---|---|---|---|
| 3,493,274 A | * | 2/1970 | Emslie et al. | ............... 310/90.5 |
| 5,847,480 A | * | 12/1998 | Post | ........................... 310/90.5 |
| 6,271,606 B1 | * | 8/2001 | Hazelton | ...................... 310/12 |
| 6,665,053 B2 | * | 12/2003 | Korenaga | ...................... 355/72 |
| 6,952,254 B2 | * | 10/2005 | Korenaga | ...................... 355/72 |
| 2002/0113498 A1 | * | 8/2002 | Emoto | ........................... 310/12 |
| 2003/0007140 A1 | * | 1/2003 | Korenaga | ...................... 355/72 |
| 2003/0052284 A1 | * | 3/2003 | Hol et al. | ..................... 250/548 |
| 2004/0032170 A1 | * | 2/2004 | Tamai et al. | ................... 310/13 |
| 2005/0002008 A1 | * | 1/2005 | De Weerdt et al. | ............. 355/72 |
| 2005/0040712 A1 | * | 2/2005 | Hazelton | ...................... 310/12 |

* cited by examiner

*Primary Examiner*—Burton S. Mulling
*Assistant Examiner*—Erik Preston
(74) *Attorney, Agent, or Firm*—Fitzpatrick, Cella, Harper & Scinto

(57) ABSTRACT

Disclosed is a magnetic floating device in which a movable magnet is sandwiched by fixed magnets in the manner that the same magnetic poles are opposed to each other, such that the movable magnet and the fixed magnets are held relatively movably in a floating direction and an intersecting direction that intersects with a polarization direction of the fixed magnets. The second magnet is placed within a range of extreme value position of a distribution of the magnetic flux density, with respect to the intersecting direction, as produced between the fixed magnets by the fixed magnets, at an opposing surface of the second magnet, being opposed to the fixed magnets. This arrangement assures a large force in the floating direction while making the force in the lateral shift direction weak. Hence, energy consumption of a lateral-direction control mechanism can be reduced significantly.

2 Claims, 19 Drawing Sheets

MAGNETIC FLOATING DEVICE

FIELD OF THE INVENTION AND RELATED ART

This invention relates to a magnetic floating device having a magnetic supporting mechanism for floating a movable portion relative to a fixed portion on the basis of a magnetic repulsion force and being arranged to maintain the non-contact floated state of the same. In another aspect, the invention concerns a positioning system and an exposure apparatus having such magnetic floating device.

Non-contact floating mechanisms include those using pneumatic pressure or magnetic force. The non-contact floating mechanisms based on magnetic force may be categorized into a type using electromagnet, a type using permanent magnet and a type using both of them. Alternatively, these floating mechanisms may be classified into a type in which a floating force is produced on the basis of magnetic attraction force, and a type in which a floating force is produced on the basis of magnetic repulsion force. FIG. 22 schematically illustrates a conventional magnetic repulsion floating device using permanent magnets. Arrows in the drawing depict magnetization vectors, and the magnets are disposed so that the same magnetic poles are opposed to each other. Denoted at 1 is a movable portion, and denoted at 2 is a fixed portion. Magnetization of the permanent magnets and dimensions of them are determined to assure that a magnetic repulsion force fz in the vertical direction Z, applied to the movable portion 1, balances with the self weight W of the movable portion 1.

It is known however that, when the movable portion is floated on the basis of magnetic repulsion force, a force (lateral shift force) causing lateral shift in a horizontal direction acts to cause unstable state. Further, it is known that the rigidity of this lateral force becomes larger with larger the rigidity of the magnetic repulsion force is. This means that making the floating device to produce smaller lateral shift inevitably results in a disadvantage of smaller floating force.

SUMMARY OF THE INVENTION

The present invention has been made in consideration of these inconveniences, and it is accordingly an object of the present invention to provide a magnetic floating device arranged to provide a large force in a floating direction but to make a force in lateral shift direction smaller thereby to assure reduction of consumed energy of a lateral-direction control mechanism.

In accordance with an aspect of the present invention, to achieve this object, there is provided a magnetic floating device for floating a movable portion relative to a fixed portion, on the basis of a magnetic force, comprising: a plurality of first magnets provided on one of the movable portion and the fixed portion; and a second magnet provided on the other of the movable portion and the fixed portion, said second magnet being disposed to be sandwiched by the first magnets in the manner that the same magnetic poles are opposed to each other; wherein the movable portion and the fixed portion are held relatively movably in a floating direction and in an intersecting direction that intersects with a polarizing direction of the first magnet, and wherein the second magnet is disposed within a range of an extreme value position of a distribution, in the intersecting direction, of a magnetic flux density produced between the first magnets by the first magnets, at an opposing surface of the second magnet being opposed to the first magnet.

In one preferred form of this aspect of the present invention, the position of the second magnet is set on the basis of the dimensional relationship between the first and second magnets with respect to the intersecting direction, such that an end portion of the second magnet is placed in such range that ranges from an extreme value position of a magnetic flux density in the intersecting direction distribution at the opposing surface of the second magnet to one-fourth of the intersecting direction size of the first magnet, originating from an end portion of the first magnet, and also such that the other end portion of the second magnet is placed within the above-described range.

The position of the second magnet may be set on the basis of the dimensional relationship between the first and second magnets with respect to the intersecting direction, such that an end portion of the second magnet is placed in such range that ranges from an extreme value position of a magnetic flux density in the intersecting direction distribution at the opposing surface of the second magnet to another extreme value position of the magnetic flux density of the intersecting direction distribution at a center of said magnetic floating device with respect to the polarization direction, and also such that the other end portion of the second magnet is placed within the above-described range.

At least one first magnet having a rectangular shape and having even magnetization may have a size in the intersecting direction which is longer than the distance between the first magnets, and it may satisfy a condition that the intersecting direction length of first magnet is greater than the intersecting direction length of the second magnet.

In accordance with another aspect of the present invention, there is provided a magnetic floating device for floating a movable portion relative to a fixed portion, on the basis of a magnetic force, comprising: a plurality of first magnets provided on one of the movable portion and the fixed portion; and a second magnet provided on the other of the movable portion and the fixed portion, said second magnet being disposed to be sandwiched by the first magnets in the manner that the same magnetic poles are opposed to each other; wherein the movable portion and the fixed portion are held relatively movably in a floating direction and in an intersecting direction that intersects with a polarizing direction of the first magnet, and wherein the second magnet has an end portion disposed within a range that ranges from an extreme value position of a magnetic flux density in a distribution with respect to the floating direction, at an opposing surface of the second magnet being opposed to the first magnet, to a central position of said magnetic floating device.

In accordance with a further aspect of the present invention, there is provided a magnetic floating device, comprising: two first magnets or rectangular shape, having the same size and the same polarization direction; and a second magnet of rectangular shape, having a size different from the first magnets and being disposed between said first magnets with its polarization direction opposed to that of the first magnets, wherein, when Lsx is the size of the first magnet in an intersecting direction that intersects with a floating direction and the polarization direction of the first magnet, Lsy is the size of the first magnet in the polarization direction, Lrx is the size of the second magnet in the intersecting direction, Lry is the size thereof in the polar ization direction, and Gd is the spacing between the first magnets, a relation $$Lsx/2 < Lrx < Lsx - (Lsy - Gd - Lry)$$

is satisfied.

In accordance with a yet further aspect of the present invention, there is provided a magnetic floating device, comprising: two first magnets or rectangular shape, having the same size and the same polarization direction; and a second magnet of rectangular shape, having a size different from the first magnets and being disposed between said first magnets with its polarization direction opposed to that of the first magnets, wherein, when Lsx is the size of the first magnet in an intersecting direction that intersects with a floating direction and the polarization direction of the first magnet, Lsy is the size of the first magnet in the polarization direction, Lrx is the size of the second magnet in the intersecting direction, Lry is the size thereof in the polarization direction, and Gd is the spacing between the first magnets, a relation $$Lsx - (Lsy+Gd) < Lrx < Lsx - (Lsy - Gd - Lry)$$

is satisfied.

In accordance with a still further aspect of the present invention, there is provided a magnetic floating device, comprising: two first magnets or rectangular shape, having the same size and the same polarization direction; and a second magnet of rectangular shape, having a size different from the first magnets and being disposed between said first magnets with its polarization direction opposed to that of the first magnets, wherein, when Lsy is the size of the first magnet in the polarization direction, Lsy is the size of the second magnet in the polarization direction, and Gd is the spacing between the first magnets, at least an end portion at one side of the second magnet is placed within a range of a distance of $\pm\frac{1}{2} * (Lsy+Gd)$ from an end of said magnetic floating device with respect to the floating direction.

In one preferred form of the present invention, the shape of the second magnet in the polarization direction is varied to assure that an end portion of the second magnet is placed adjacent an extreme value position of a magnetic flux density in a distribution, with respect to the intersecting direction or the floating direction, of a polarization direction component of the magnetic flux density as produced between the first magnets by the first magnets.

In accordance with another aspect of the present invention, there is provided a positioning system, comprising: a rough-motion stage; a fine-motion stage; and a magnetic floating device as recited above, for floating said fine-motion stage relative to said rough-motion stage.

In accordance with a further aspect of the present invention, there is provided an exposure apparatus for transferring a pattern to a substrate, comprising: a stage for carrying a substrate thereon; transfer means for transferring a pattern to the substrate; and a magnetic floating device as recited above, for floating said stage.

In summary, in accordance with a magnetic floating device of the present invention, the force in un unwanted direction can be reduced. Furthermore, the floating force of the magnetic floating device is enlarged. Hence, the size and weight of the device can be made smaller.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

One preferred embodiment of the present invention may have a structure that, where a second magnet is a movable magnet, the magnetic force produced at the movable magnet may be evaluated in accordance with Fleming's left-hand rule (F=IxB*1), and that a magnetic flux density component that produces a floating force is made large while another magnetic flux density component that produces a lateral shift force is made small. In the lateral shift direction, the direction of a magnetic force produced at the surface being opposed to the magnetic surface may be opposite, such that a lateral shift force canceling structure and movable magnet shape may be adopted. An exposure apparatus and/or a positioning system that uses a magnetic floating device such as described above, ensures reduction of loads to a linear motor and decrease of consumed energy of a control mechanism as well.

Now, preferred embodiments of the present invention will be described with reference to the attached drawings. In the following description, a plurality of first magnets are provided at fixed side and they are referred to as fixed magnets, whereas a second magnet sandwiched by first magnets is provided at a movable side and it is referred to as a movable magnet. However, the first magnet may be made movable while the second magnet may be fixed. Thus, in each of the following embodiments, a case wherein the relationship between the movabilty and immovability of the first and second magnets is inverted is implicitly involved.

[Embodiment 1]

Figure 1:
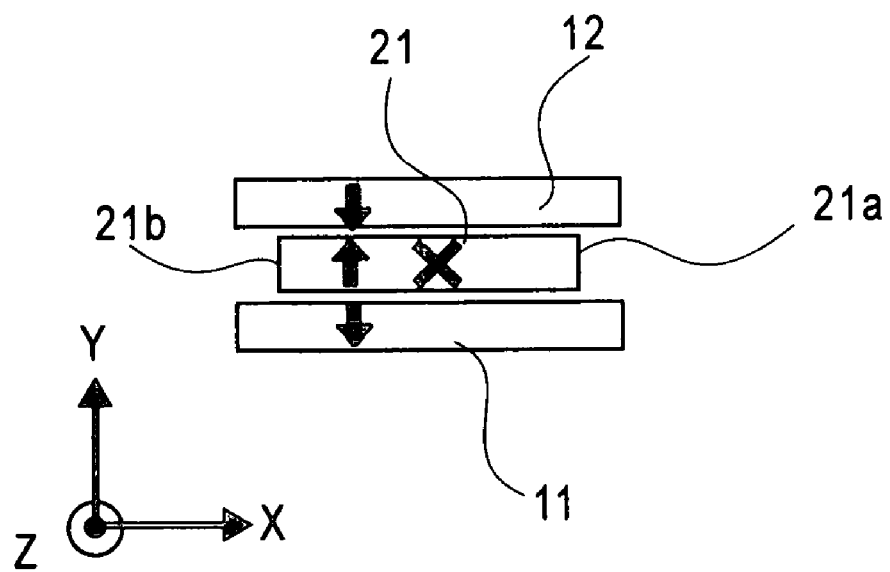
FIG. 1 is an X-Y plan view of a magnetic floating device according to an embodiment of the present invention, as seen from a floating direction.
Figure 2:
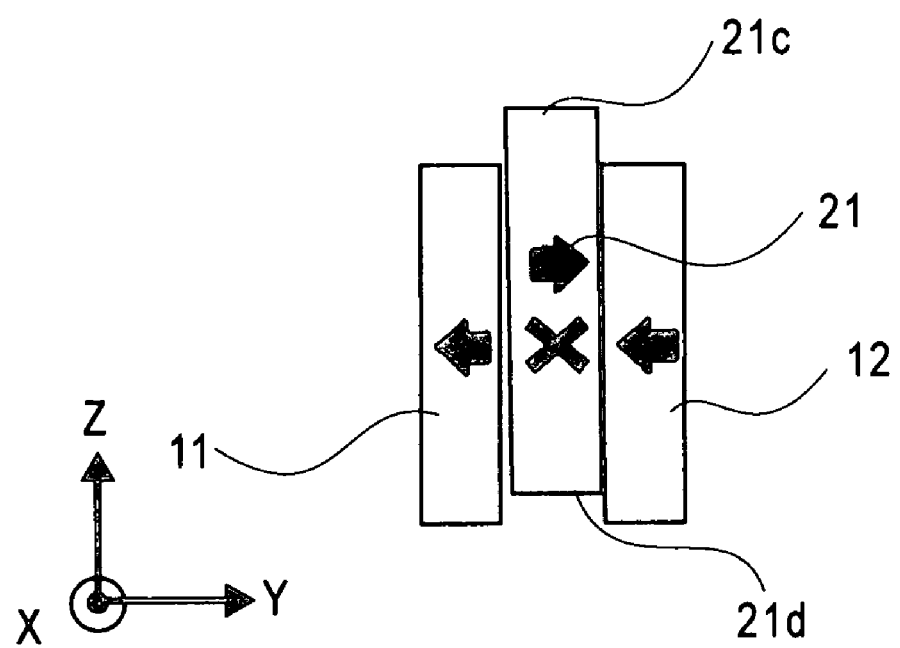
FIG. 2 is a Y-Z side view of a magnetic floating device according to an embodiment of the present invention, as seen from a sideward direction.
Figure 3:
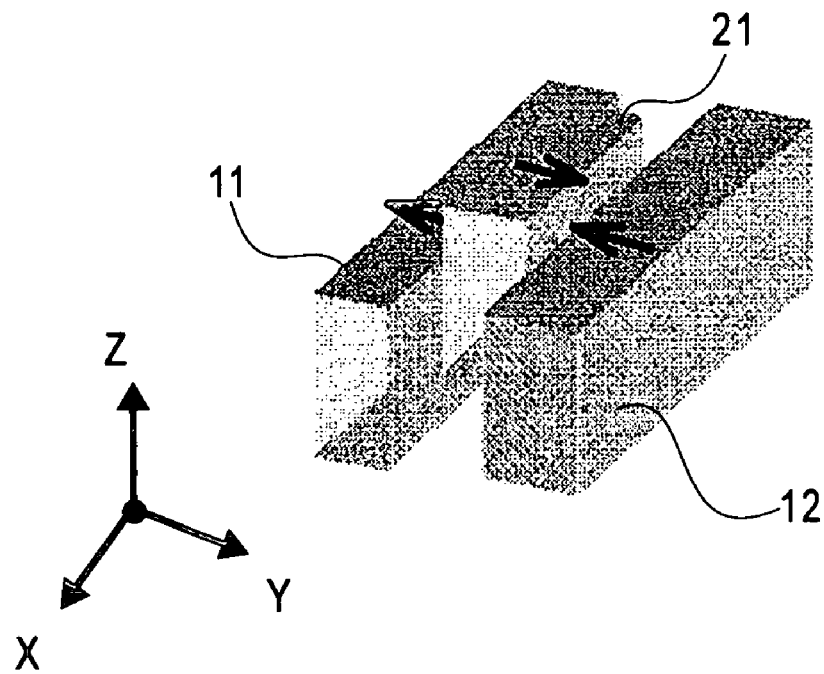
FIG. 3 is a perspective view for explaining a magnetic floating device according to an embodiment of the present invention.

FIGS. 1–3 show a magnetic floating device according to a first embodiment of the present invention. FIG. 1 is an X-Y plan view, FIG. 2 is a Y-Z plan view, and FIG. 3 is a perspective view. In the magnetic floating device of FIGS. 1–3, an X-axis direction corresponds to a lengthwise direction, and a Y-axis direction corresponds to a polarization direction of a magnet. A Z-axis direction corresponds to the floating direction. The lengthwise direction intersects with the polarization direction and the floating direction perpendicularly. Arrows in the drawings depict the directions of magnetization of magnets. A symbol x denotes the origin which is the center of the magnetic floating device. Denoted at 11 and 12 are fixed magnets, and their orientation of magnetization is put on in the same direction along the Y-axis direction, as shown in FIG. 1.

Denoted at 21 is a movable magnet, and its orientation of magnetization is put on in an opposite direction to that of the fixed magnets, along the Y-axis direction. A magnetic force in the X-axis direction produced at the movable magnet 2 acts in opposite directions, upon the surfaces 21a and 21b thereof. Furthermore, the magnetic force in the Z-axis direction produced at the movable magnet 21 acts in the same direction, upon the surfaces 21c and 21d thereof.

In the magnetic floating device of the present invention, the magnetic forces produced at the movable magnet 21 can be expressed in accordance with Fleming's left-hand rule, as follows.

$$Fx = Iz \times By * lz \quad (1)$$

$$Fy = Iz \times Bx * lz \quad (2)$$

$$Fy = Ix \times Bz * lx \quad (3)$$

$$Fz = Ix \times By * lx \quad (4)$$

In equations (1)–(4), F is the force acting on the movable magnet 21, and I is an (equivalent magnetization) electric current of the movable magnet 21. Also, B is a magnetic flux density produced at the movable magnet 21 portion by the fixed magnets 11 and 12, and l is the size of the movable magnet 21. Further, subscripts denote X-axis, Y-axis and Z-axis, respectively. In equations (1) and (2), the magnetic flux density components By and Bx produced by the fixed magnets 11 and 12 satisfy sine and cosine relationship in the X-Y plane. Similarly, in equations (3) and (4), the components By and Bz satisfy sine and cosine relationship in the Y-Z plane.

Figure 4:
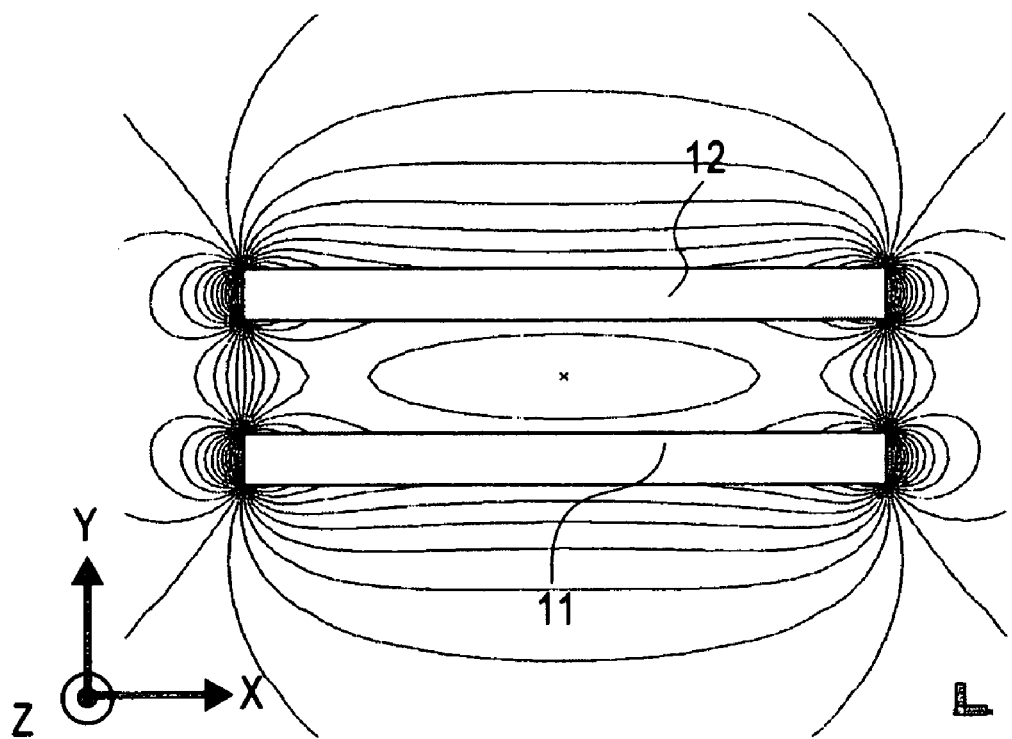
FIG. 4 is a chart of polarization-direction magnetic flux density component and longitudinal direction (By-X) contour-line, produced by fixed magnets in an embodiment of the present invention.
Figure 5:
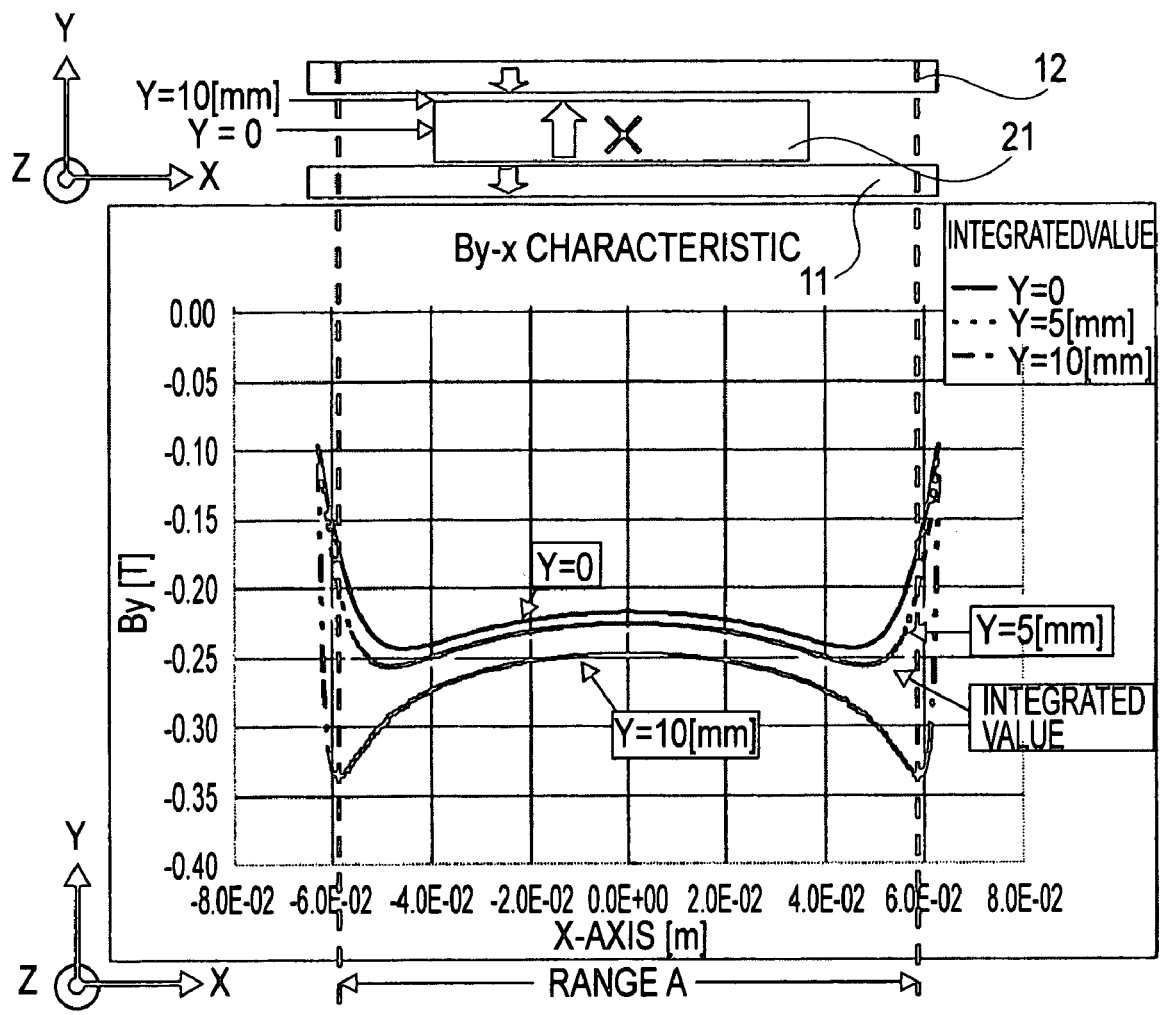
FIG. 5 is a graph for explaining a first embodiment of the present invention and being based on the contour-line chart of FIG. 4, wherein Y=0 in the graph represents the center of a magnetic floating device and Y=10 [mm] depicts polarization-direction magnetic flux density characteristic upon the top face (opposed face) of a movable magnet.

FIG. 4 shows X-axis direction distribution of a Y-axis magnetic flux density (By) component (hereinafter, "By component") which is produced by the fixed magnets 11 and 12 at Z=0 when, in the X-Y plane of FIG. 1, the magnetization of the movable magnet 21 is cleared. FIG. 5 is a graph of the By distribution between the fixed magnets 11 and 12 at Z=0 shown in FIG. 4. The axis of abscissa depicts an X coordinate (the range is within the fixed magnet), while the axis of ordinate denotes the By value. In FIG. 5, Y=0 depicts the By-X characteristic at the center of the magnetic floating device, and Y=10 [mm] depicts the By-X characteristic at the upper surface (opposing surface 21e being opposed to the fixed magnet 12) in FIG. 5 of the movable magnet 21, corresponding to the largest coordinate value of Y in the Y-axis direction. The integrated value is a value obtainable by integrating the By-X characteristic with respect to the Y axis. The extreme value position of the integrated By component is defined between the extreme value positions of the By-X characteristic at Y=0 and Y=10 [mm].

The wording "a distribution in a lengthwise direction of a polarization direction component" to be referred to later in the claims attached to this specification corresponds to the By-X characteristic in FIG. 5. Similarly, the wording "polarization direction center of a magnetic floating device" to be referred to later in the claims attached to this specification corresponds to Y=0 in FIG. 5, and the wording "an opposing surface of a movable magnet in the polarization direction" corresponds to the position Y=10 [mm]. The range A in FIG. 5 is the range that extends between the extreme positions defined at the end edges of the fixed magnets 11 and 12, in relation to a lengthwise direction distribution of the By component produced between the fixed magnets 11 and 12 by these fixed magnets 11 and 12 at the opposing surface (Y=10 [mm]) of the movable magnet 21. If the end portion of the movable magnet 21 is positioned inside the range A of FIG. 5, the magnetic forces in X-axis direction act on in opposite directions, upon the surfaces 21a and 21b of the movable magnet. Thus, the polarization direction magnetic flux density component By less changes with respect to the X axis and, therefore, from equation (1), the magnetic force in the X-axis direction, acting on the movable magnet 21, becomes smaller. Also, as regards the magnetic force in the Y-axis direction, since Bx in equation (2) becomes smaller with larger the distance from the end of the fixed magnet 11 and 12 is, the lateral shift force in the Y-axis direction acting on the movable magnet 21 becomes smaller.

Where the X-axis direction length of the movable magnet 21 and the X-axis direction length of the fixed magnets 11 and 12 are equal to each other and when the magnitude of the maximum floating force acting on the movable magnet 21 is taken as 1, if the end portion of the movable magnet 21 is within the range A of FIG. 5 and the X-axis direction length of the movable magnet 21 is made not shorter than a half of the X-axis direction length of the fixed magnets 11 and 12, from equation (4), that is, "Fz=Ix×By*lx", lx becomes equal to or more than 0.5. Therefore, with respect to the maximum floating force, the decrease of floating force can be suppressed to a half or less.

Where the fixed magnet has a rectangular shape and its magnetization is even, in order to ensure that more than three extreme Values of By component are produced between the fixed magnets 11 and 12 as shown in FIG. 5, it is necessary that the X-axis direction length of the fixed magnets 11 and 12 is longer than the gap spacing between the fixed magnets 11 and 12. If the X-axis direction length of the fixed magnets 11 and 12 is shorter than the gap spacing of the fixed magnets 11 and 12, the end portion becomes closer and the By component causes interference such that it becomes large at the center of the fixed magnet. Consequently, only a single extreme Value is produced between the fixed magnets.

[Embodiment 2]

Figure 6:
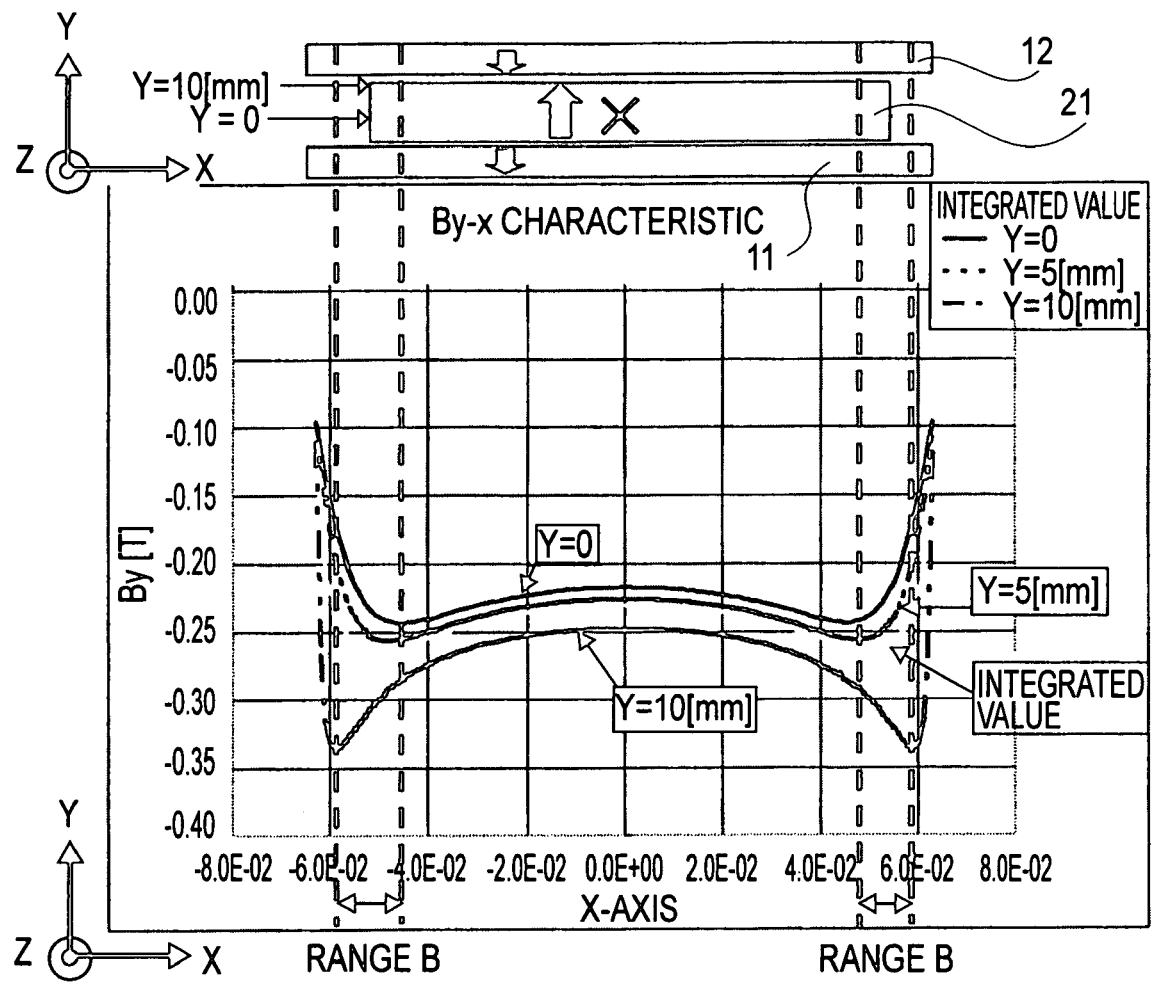
FIG. 6 is an X-Y plan view for explaining a second embodiment of the present invention.

FIG. 6 shows a magnetic floating device according to a second embodiment of the present invention, and it corresponds to FIG. 5 of the first embodiment. In the first embodiment, although the lateral shift force can be made smaller, the floating force decreases as well. The second embodiment is an example wherein the floating force is made larger by making the lateral shift force smaller. The range B in FIG. 6 is a range that extends from an extreme value position at the end edge of the fixed magnet of the By component, at the magnetic floating device center (Y=0), to an extreme value position at an end edge of the fixed magnet of the By component at the opposing surface (Y=10 [mm]) of the movable magnet 21, opposed to the fixed magnet 12. The wording "polarization direction center of a magnetic floating device" to be referred to later in the claims attached to this specification corresponds to Y=0 in FIG. 6.

Where the end portion of the movable magnet 21 is positioned within the range B of FIG. 6, regarding the magnetic force in the X-axis direction, at the surfaces 21a and 21b of the movable magnet 21 the magnetic forces are produced in opposite directions. In the range B, since the lengthwise direction distribution of the By component approximately has a symmetry, the magnetic flux density less changes with a displacement of the movable magnet in the X-axis direction. Thus, from equation (1), the magnetic force in the X-axis direction acting on the movable magnet 21 becomes smaller. Regarding the magnetic force in the Y-axis direction, since By and Bx are in sine and cosine relationship, the Bx component becomes smaller if the By component is within the range B. Thus, from equation (2), the magnetic force in the Y-axis direction acting on the movable magnet 21 becomes smaller. Furthermore, regarding the magnetic force in the Z-axis direction, since the By component is in the range B and its absolute value becomes larger, from equation (4), a large floating force (Z-axis direction force) is obtainable.

[Embodiment 3]

Figure 7:
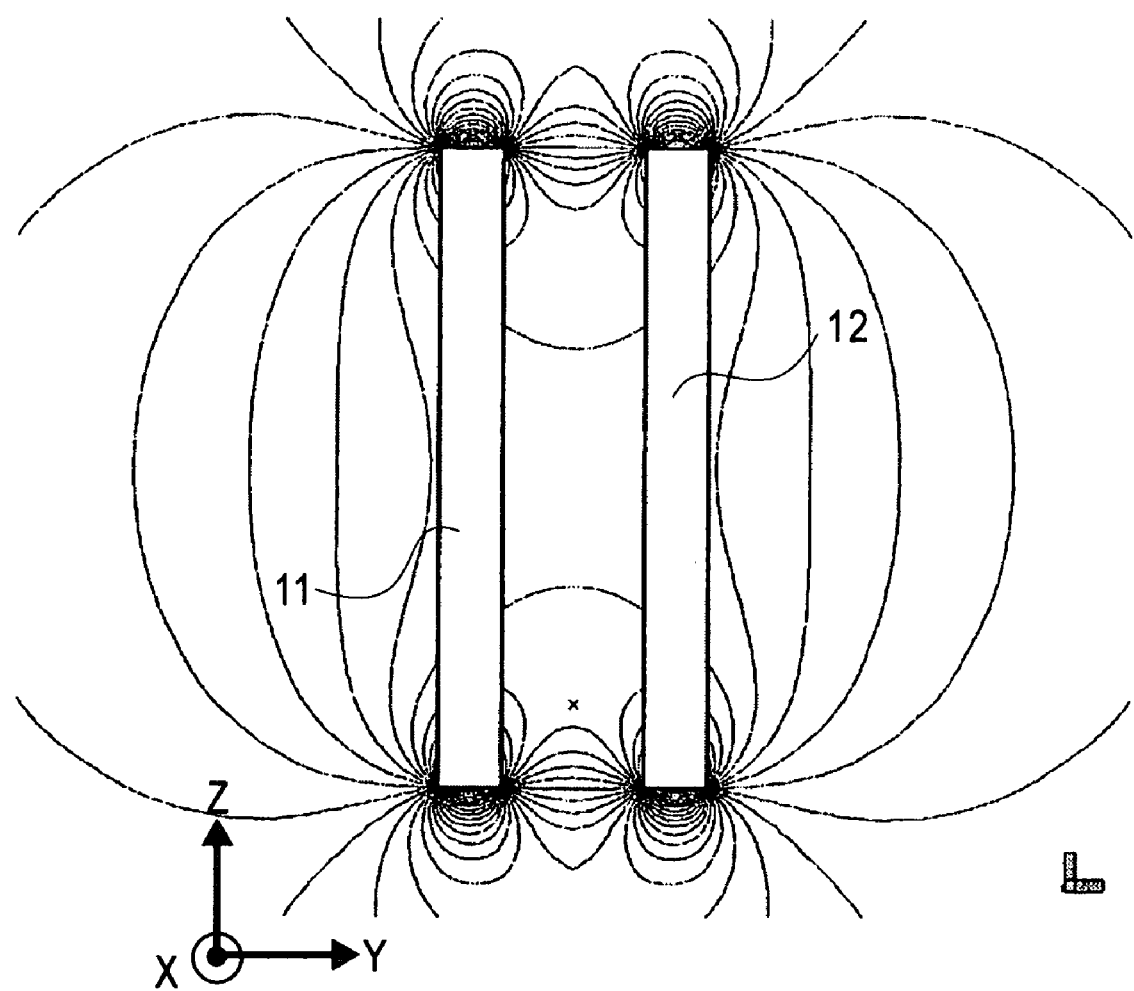
FIG. 7 is a chart of polarization-direction magnetic flux density component and floating direction (By-Z) contour-line, produced by fixed magnets in an embodiment of the present invention.
Figure 8:
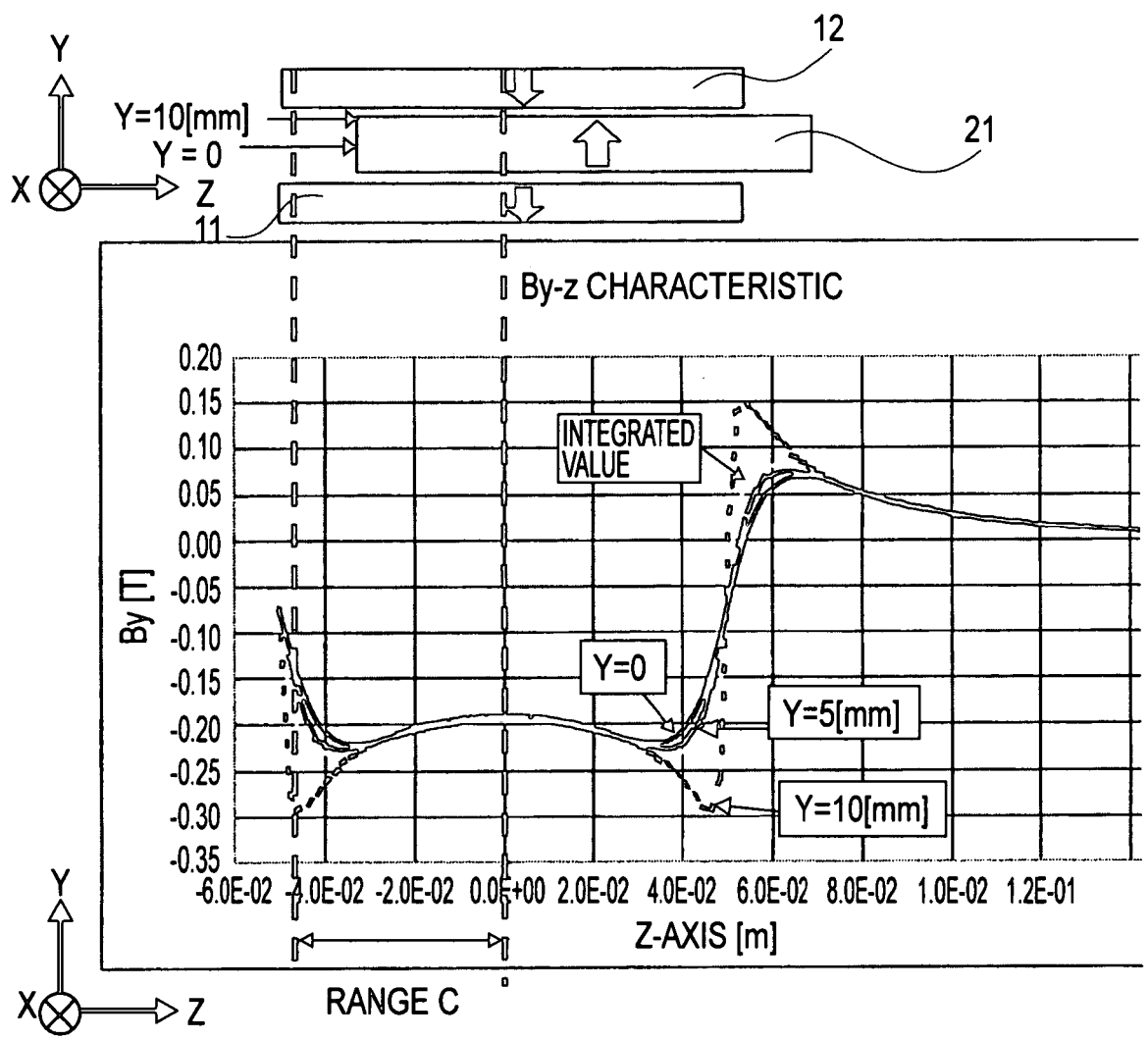
FIG. 8 is a graph for explaining a third embodiment of the present invention and being based on the contour-line chart of FIG. 7, wherein Y=0 in the graph represents the center of a magnetic floating device and Y=10 [mm] depicts polarization-direction magnetic flux density characteristic upon the top face (opposed face) of a movable magnet.

A third embodiment of the present invention is an example wherein, in the Y-Z plane of FIG. 2, magnetization of a movable magnet 21 is cleared and a Z-axis direction distribution of Y-axis magnetic flux density (By) component in the X=0 section, to be produced by fixed magnets 11 and 12, is formed in the manner as shown in FIG. 7. FIG. 8 is a graph showing the Z-axis direction distribution of the By component at X=0 in FIG. 7. The axis of abscissa denotes Z-axis coordinate, and the axis of ordinate denotes By component. In FIG. 8, Y=0 depicts the By-X characteristic at the center of the magnetic floating device, and Y=10 [mm] depicts the By-X characteristic at the upper surface (opposing surface 21e being opposed to the fixed magnet 12) in FIG. 8 of the movable magnet 21. The integrated value is a value obtainable by integrating the By-Z characteristic with respect to the Y axis. The extreme value position of the integrated Y-axis magnetic flux density By is defined between the extreme value positions at Y=0 and Y=10 [mm].

The wording "a distribution in a floating direction of a polarization direction component" to be referred to later in the claims attached to this specification corresponds to the Z-axis distribution of the By component in FIGS. 7 and 8. In FIG. 8, Y=0 depicts the By-Z characteristic at the center of the magnetic floating device, and Y=10 [mm] depicts the By-Z characteristic at the upper surface (opposing surface 21e being opposed to the fixed magnet 12) in FIG. 8 of the movable magnet 21. The integrated value is a value obtainable by integrating the By-Z characteristic with respect to the Y axis.

The range C in FIG. 8 is a range that extends between the center of the magnetic floating device in the Z-axis direction and the extreme position of the end edge of the fixed magnet of the By-Z characteristic at the opposing surface (Y=10 [mm]) of the movable magnet 21, opposed to the fixed magnet 12. If the end portion of the movable magnet 21 is positioned inside the range C of FIG. 8, regarding the magnetic force in the Y-axis direction, it becomes weaker as spaced farther away from the Bz fixed magnet end portion in equation (3). Moreover, since, at the By extreme position, Bz is in sine and cosine relationship, it becomes much weaker. Therefore, the lateral shift force in the-Y-axis direction becomes small. Regarding the magnetic force in the Z-axis direction, from equation (4), if the end portion of the movable magnet 21 is at the Z coordinate where an absolute value of By-Z characteristic of FIG. 8 is large, the floating force becomes large. In FIG. 8, there are three extreme values of By between the fixed magnets 11 and 12, the number of extreme value of By may be one.

The first embodiment or the second embodiment may be used in combination with the third embodiment, and such combination facilitates optimization. Namely, because the end portion of the movable magnet 21 becomes close to an extreme value of By component produced by the fixed magnets 11 and 12, the force in the floating direction in equations (1)–(4) becomes larger while the force in the lateral shift direction becomes smaller.

Figure 9:
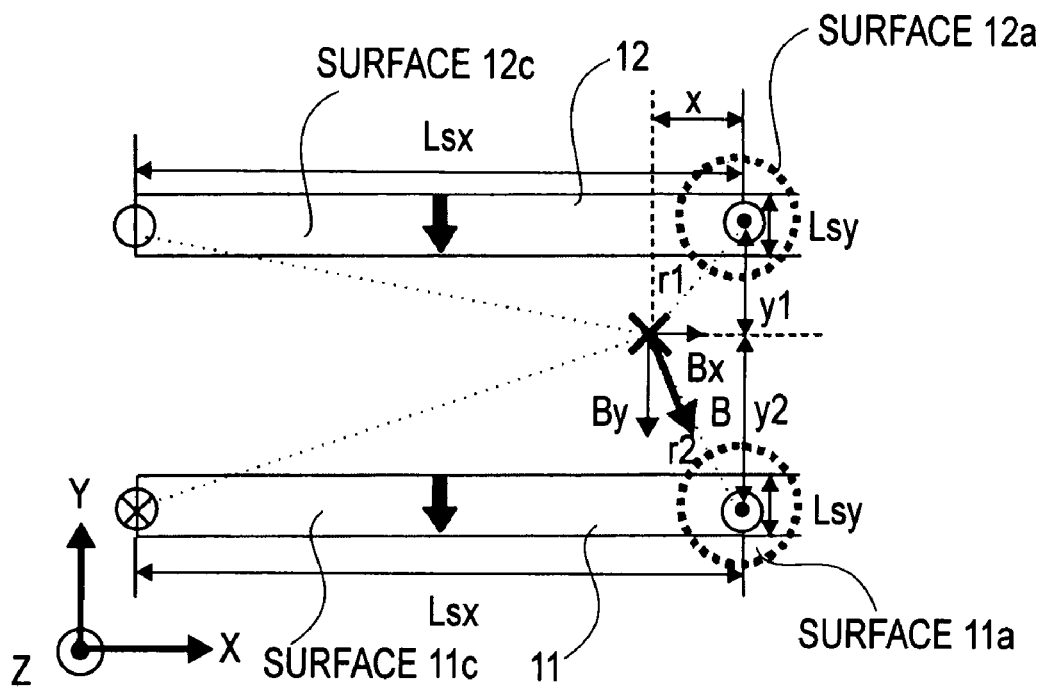
FIG. 9 is an X-Y plan view for explaining a magnetic -flux density produced by and between fixed magnets of an embodiment of the present invention.
Figure 10:
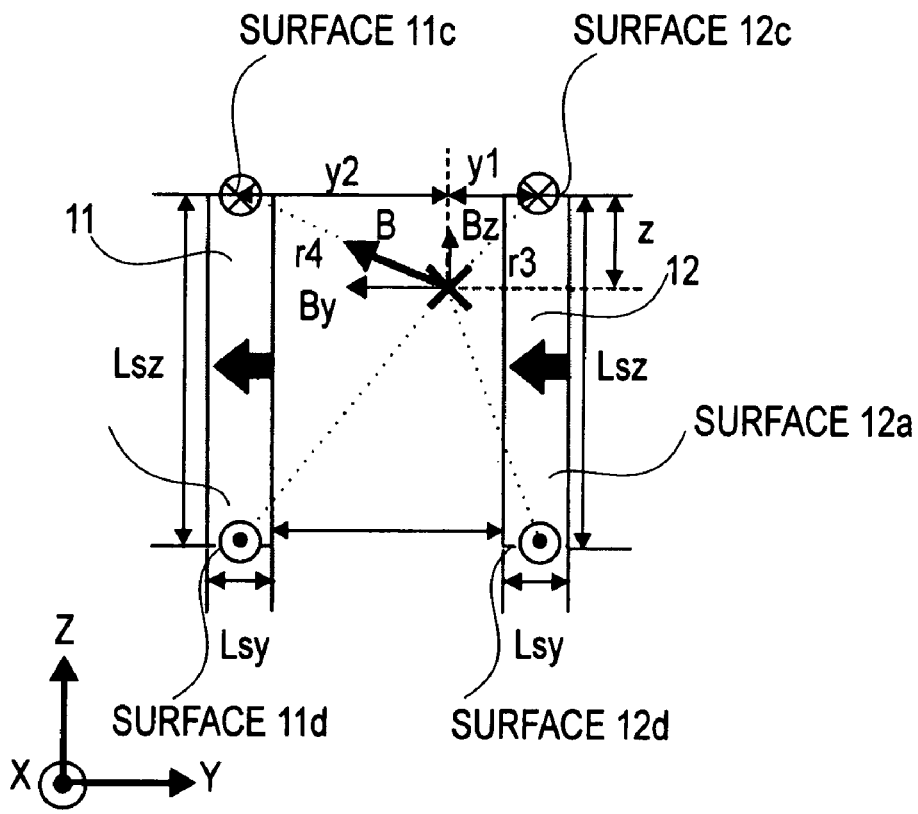
FIG. 10 is a Y-Z side view for explaining a magnetic flux density produced by and between fixed magnets of an embodiment of the present invention.

As shown in FIGS. 9 and 10, where the fixed magnets are considered as an electromagnet, the magnetic flux density B produced between the fixed magnets 11 and 12 by these fixed magnets can be expressed by the following equation:

$$B = \sum_i^8 B_i = \sum_i^8 \frac{I}{2\pi\mu_0 r_i} \tag{5}$$

wherein I is the electric current flowing through the fixed magnets, ri is the distance from the end of the fixed magnet to the measurement point, $\mu 0$ is the magnetic permeability of vacuum, and the total number 8 means that the electric current flowing through the fixed magnets 11 and 12 has eight faces. Since B in equation (5) is inversely proportional to the distance r, the surfaces 11a, 12a, 11c and 12c shown in FIG. 9 become dominant, and the influence of the other surfaces becomes small. Thus, the magnetic flux density component in the Y-axis direction can be considered in accordance with the following equation (because of the symmetry, it is considered with respect to one side of the fixed magnet):

$$By = \frac{I}{2\pi\mu_0 r_1}\frac{x}{r_1} + \frac{I}{2\pi\mu_0 r_2}\frac{x}{r_2} + \frac{I}{2\pi\mu_0 r_3}\frac{z}{r_3} + \frac{I}{2\pi\mu_0 r_4}\frac{z}{r_4} \tag{6}$$

wherein x is the X-axis distance from the surfaces 11a and 12a to the measurement point, and z is the Z-axis direction distance from the surfaces 11c and 12c to the measurement point. By effecting partial differential to equation (6) with respect to x, the x that provides an extreme value of By-X characteristic is determined, and then the relationship between x and y is considered.

$$\frac{\partial By}{\partial x} = \tag{7}$$

$$\frac{2\pi\mu_0 I(x^2 + y_1^2) - I \cdot x(4\pi\mu_0 x)}{(2\pi\mu_0(x^2 + y_1^2))^2} + \frac{2\pi\mu_0 I(x^2 + y_2^2) - I \cdot x(4\pi\mu_0 x)}{(2\pi\mu_0(x^2 + y_2^2))^2} = 0$$

$$x = \pm y_1, \pm y_2 \tag{8}$$

Thus, the relation of equation (8) is provided, and the x that can be an extreme value of By is determined in accordance with the Y-axis direction distance from the measurement position to the fixed magnet electric current (fixed magnet end). Equation (8) has two extreme values x=y1 and y2 inside the fixed magnet at the surface 11a and 12a side. This is because of an assumption that, while the dominant surfaces (11a and 12a) of the fixed magnets are defined, the other surfaces have no influence. Therefore, the number of extreme positions of By-X characteristic described with reference to the first and second embodiments is only one in the range of $x \geq 0$, and it corresponds to the Y-axis direction distance from the measurement position to the dominant fixed magnet.

Similarly, by effecting partial differential to equation (6) with respect to z, the z that can be an extreme value of By-Z characteristic is determined in accordance with the Y-axis direction distance from the measurement position to the fixed magnet electric current (end of fixed magnet).

$$Z = \pm y_1, \pm y_2 \tag{9}$$

Equation (9) has two extreme values z=y1 and y2 inside the fixed magnet at the surface 11c and 12c side. This is because of an assumption that, while the dominant surfaces (11c and 12c) of the fixed magnets are defined, the other surfaces have no influence. Therefore, the number of extreme positions of By-Z characteristic described with reference to the third embodiment is only one in the range of $z \geq 0$, and it corresponds to the Y-axis direction distance from the measurement position to the dominant fixed magnet.

Figure 11:
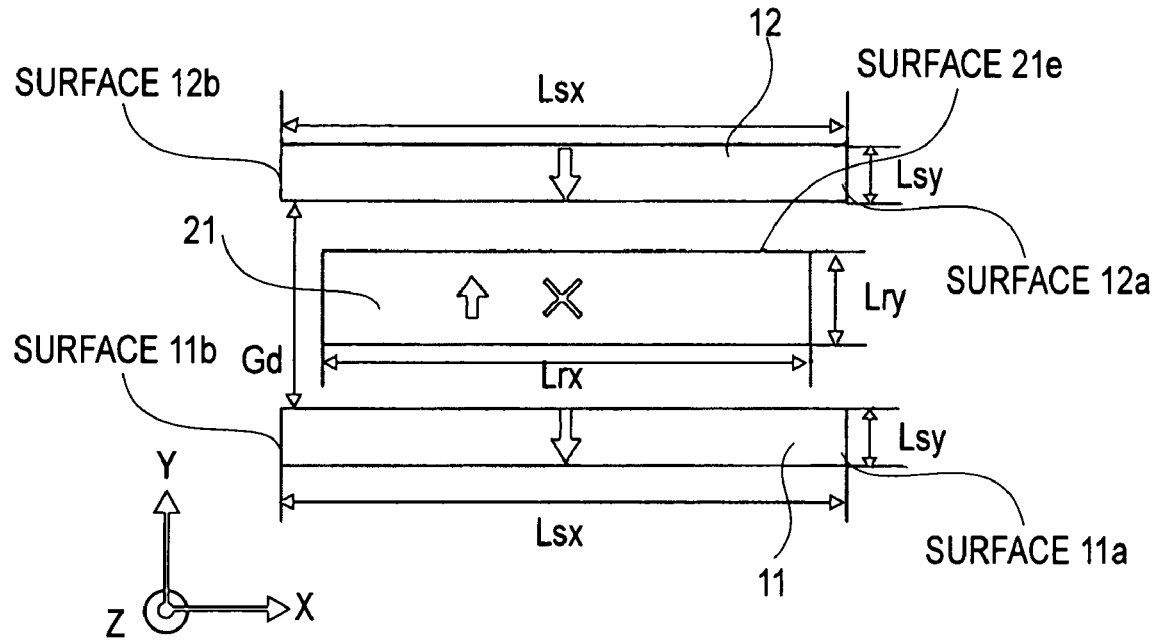
FIG. 11 is an X-Y side view for defining the sizes of a magnetic floating device according to an embodiment of the present invention.
Figure 12:
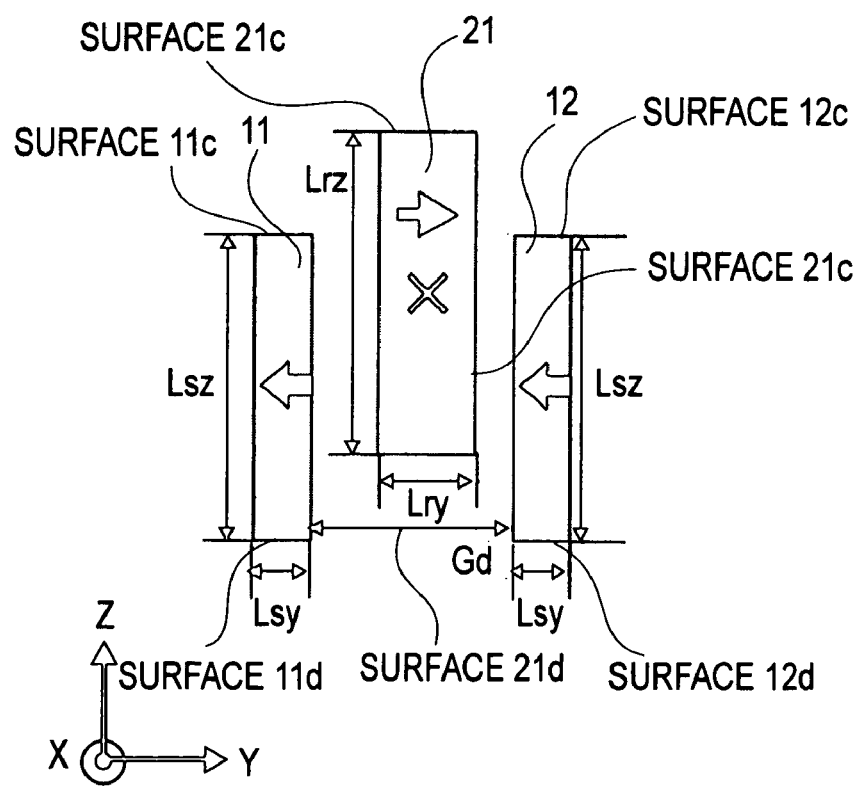
FIG. 12 is a Y-Z side view for defining the sizes of a magnetic floating device according to an embodiment of the present invention.

FIGS. 11 and 12 show symbols for various sizes of the magnetic floating device. The origin and coordinates are taken in a similar manner as shown in FIGS. 11 and 12, and the floating direction lies in the Z-axis direction. The sizes of the fixed magnets 11 and 12 in the X-, Y- and Z-axis directions are denoted by Lsx, Lsy and Lsz, respectively. The sizes of the movable magnet 21 in the X-, Y- and Z-axis directions are denoted by Lrx, Lry and Lrz, respectively. The upper surface of the movable magnet 21 with respect to the Y-axis direction is taken as an opposing surface 21e. Regarding the magnetic flux density produced between the fixed magnets 11 and 12 by these magnets, since the fixed magnet 12 is dominant, the X coordinate of an extreme value of By-X characteristic in a case where the Y-axis direction position is present upon the opposing surface 12e can be expressed by the following equation (see FIG. 11).

$$\text{Extreme value coordinate of } By\text{-}X \text{ characteristic} \approx \pm\left|\frac{Lsx}{2} - \frac{Lsy + Gd - Lry}{2}\right| \tag{10}$$

The extreme value when the By component is integrated throughout the whole surface of the movable magnet 21 is formed inside the fixed magnet, from the X coordinate of equation (10). Thus, the magnetic forces in unwanted directions, acting on the movable magnet, are weakened and, therefore, the relationship between the movable magnet 21 and the fixed magnets 11 and 12 with respect to the X-axis direction dimension is expressed as follows.

$$\frac{Lsx}{2} < Lrx < Lsx - (Lsy + Gd - Lry) \tag{11}$$

Since equation (11) involves decrease of floating force, the relationship of X-axis direction size of the movable magnet 21 effective to prevent the decrease of floating force is looked for. Regarding the magnetic flux density produced between the fixed magnets 11 and 12 by these magnets, the X coordinate of an extreme value of By-X characteristic in a case where the Y-axis direction position is present at the center of the magnetic floating device can be expressed by the following equation (see FIG. 9).

$$\text{Extreme value coordinate of } By\text{-}X \text{ characteristic} \approx \pm\left|\frac{Lsx}{2} - \frac{Lsy + Gd}{2}\right| \tag{12}$$

The extreme value when the By component is integrated throughout the whole surface of the movable magnet 21 is formed outside the fixed magnet, from the X coordinate of equation (12), and inside from the equation (10). Thus, the magnetic forces in unwanted directions, acting on the movable magnet, are weakened. The relationship between the movable magnet 21 and the fixed magnets 11 and 12 with respect to the X-axis direction dimension, effective to suppress the decrease of floating force, can be expressed by the following equation.

$$Lsx-(Lsy+Gd)<Lrx<Lsx-(Lsy+Gd-Lry) \qquad (13)$$

Since in equation (13), as compared with equation (11), the X-axis direction size of the movable magnet can be prolonged, it is assured to suppress the decrease of floating force.

Next, the disposition of the movable magnet 21 with respect to the floating direction will be considered. Regarding the magnetic flux density produced between the fixed magnets by these magnets, from equation (9), the Z-coordinate of the extreme value of By-Z characteristic in a case where the Y-axis direction position is present at the center of the magnetic floating device, can be expressed by the following equation (see FIG. 12).

$$\begin{array}{l}\text{Extreme value}\\ \text{coordinate of}\\ By\text{-}Z \text{ characteristic}\end{array} \approx \pm\left|\frac{Lsx}{2} \pm \frac{Lsy+Gd}{2}\right| \qquad (14)$$

Thus, within the range of a distance±(lsy+Gd)/2 from the end face (surfaces 11c, 12c, 11d and 12d) of the fixed magnet shown in FIG. 12, an extreme value defined by integrating the By component produced by the fixed magnets 11 and 12 throughout the whole surface of the movable magnet 21 is present. Therefore, by disposing the end face (surfaces 21c and 21d) of the movable magnet 21 within this range, a large floating force is attainable and yet magnetic forces in unwanted directions can be suppressed. While in the above-described examples the fixed magnets are considered as electromagnet, permanent magnets may be used similarly.

Table 1 below shows the advantageous effects as the end portion of the movable magnet 21 is disposed at an extreme value position of the lengthwise direction distribution of the By component produced by the fixed magnets 11 and 12. More specifically, Table 1 shows the results of simulation made by changing only the lengthwise direction dimension of the fixed magnets 11 and 12, without changing the dimension of the movable magnet 21, and by minutely displacing the movable magnet. The one-side clearance dimension difference in Table 1 refers to a value of a half of a remainder defined by subtracting the lengthwise direction size of the movable magnet 21 from the lengthwise direction size of the fixed magnets 11 and 12.

TABLE 1

|  | One-Side Clearance Dimension Diff. [mm] | Lateral Shift Force (X-axis) [N] | Lateral Shift Force (Y-axis) [N] | Floating Force [N] |
| --- | --- | --- | --- | --- |
| By Extreme Position | 10 | 3.40 | −3.83 | 634.54 |
|  | 13 | −0.23 | −0.11 | 631.34 |
|  | 15 | −1.40 | **** | 629.00 |
|  | 20 | −2.74 | **** | 623.14 |
|  | 30 | −2.51 | **** | 613.58 |
|  | 40 | −1.76 | **** | 607.06 |
|  | 50 | −1.30 | **** | 602.50 |
|  | 60 | −0.79 | **** | 598.94 |
|  | 70 | −0.52 | **** | 596.12 |

Figure 13:
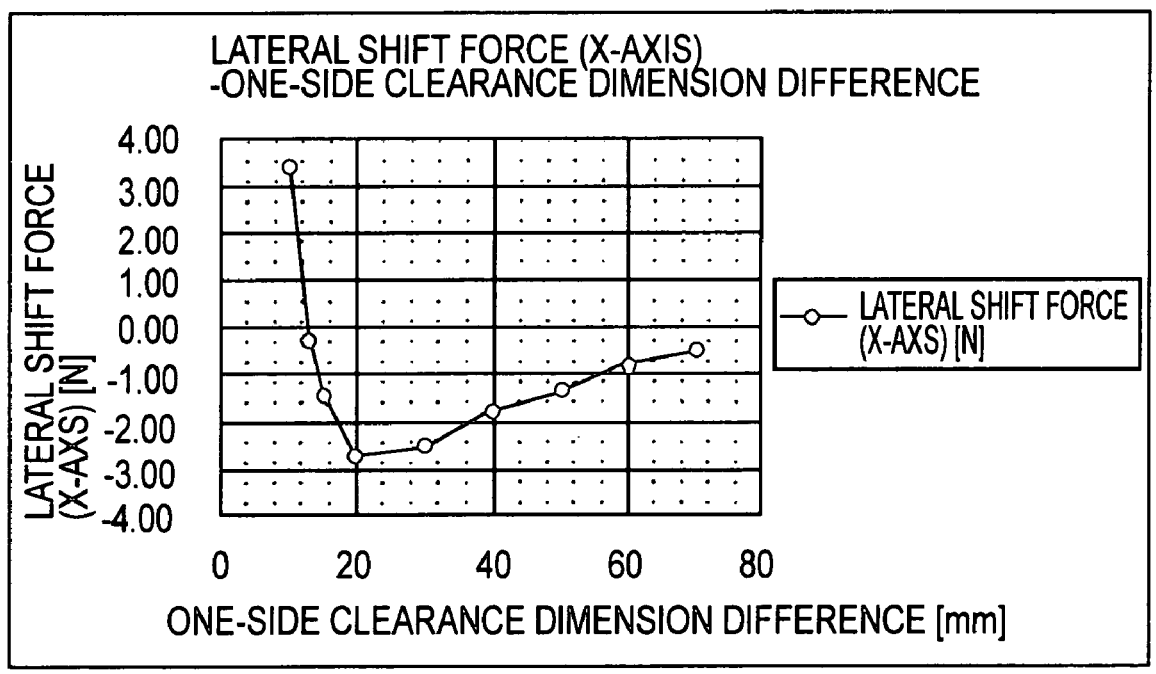
FIG. 13 is a chart of X-axis lateral shift force characteristic, for explaining advantageous effects of the present invention.
Figure 14:
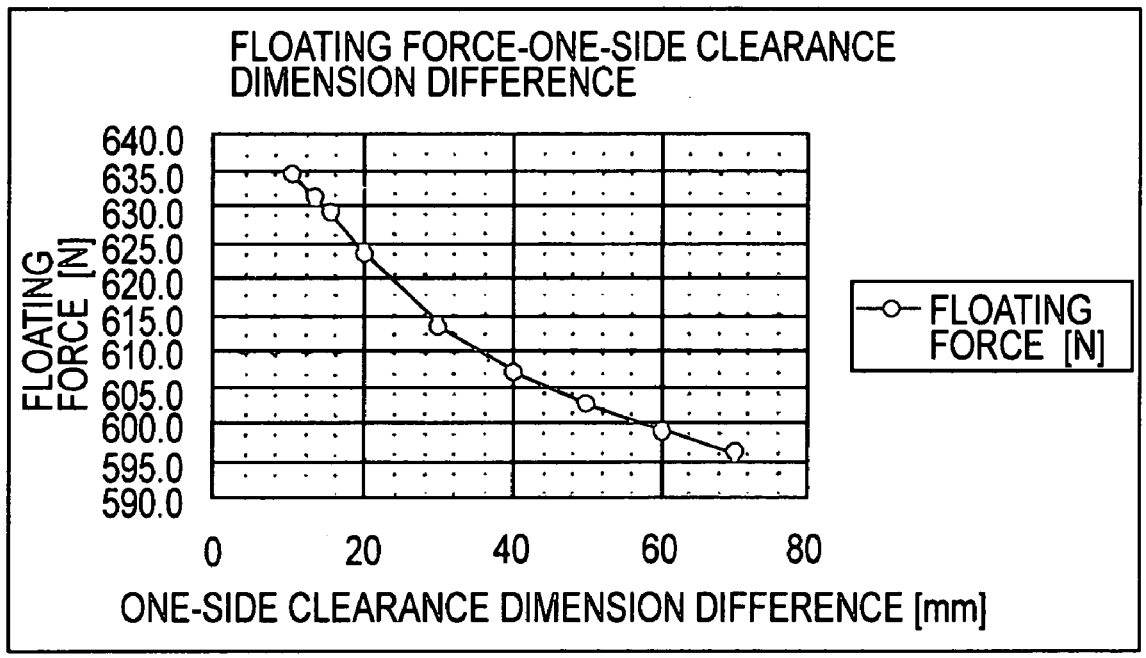
FIG. 14 is a chart of Z-axis floating force characteristic, for explaining advantageous effects of the present invention.

The one-side clearance dimension difference 13 [mm] corresponds to the position of an extreme value defined by integrating the By component, produced by the fixed magnets 11 and 12, throughout the whole surface of the movable magnet 21. It is seen from the results shown in Table 1 that, when the extreme position of By component of the fixed magnets 11 and 12 is taken, the lateral shift forces can be made small and the decrease of floating force can be suppressed as well. FIG. 13 shows the one-side clearance dimension difference (Table 1) to lateral shift (X-axis) characteristic, and FIG. 14 shows the one-side clearance dimension difference to floating force (Z-axis) characteristic.

[Embodiment 4]

Figure 15:
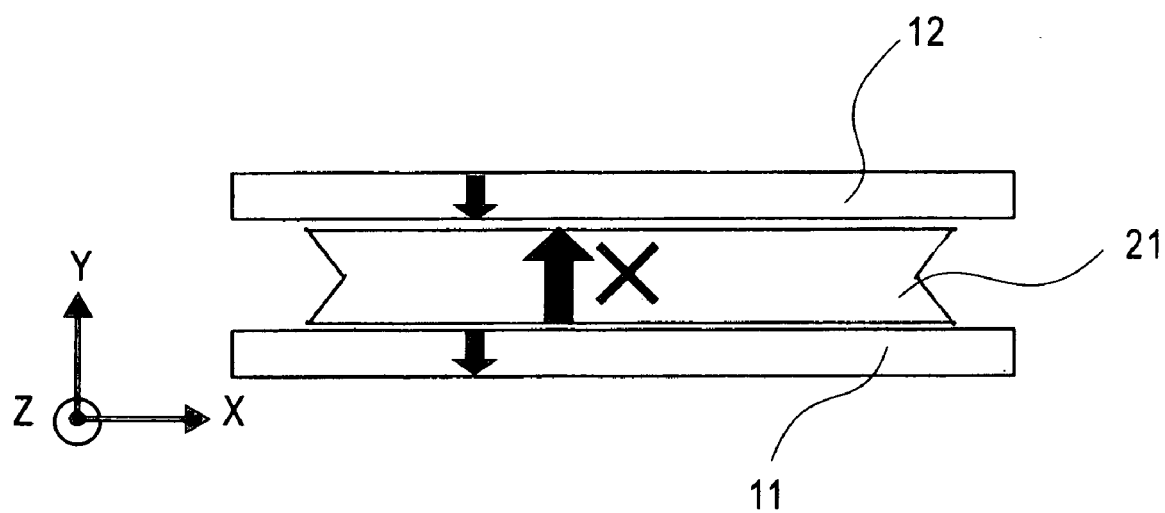
FIG. 15 is an X-Y plane view of a fourth embodiment of the present invention.
Figure 16:
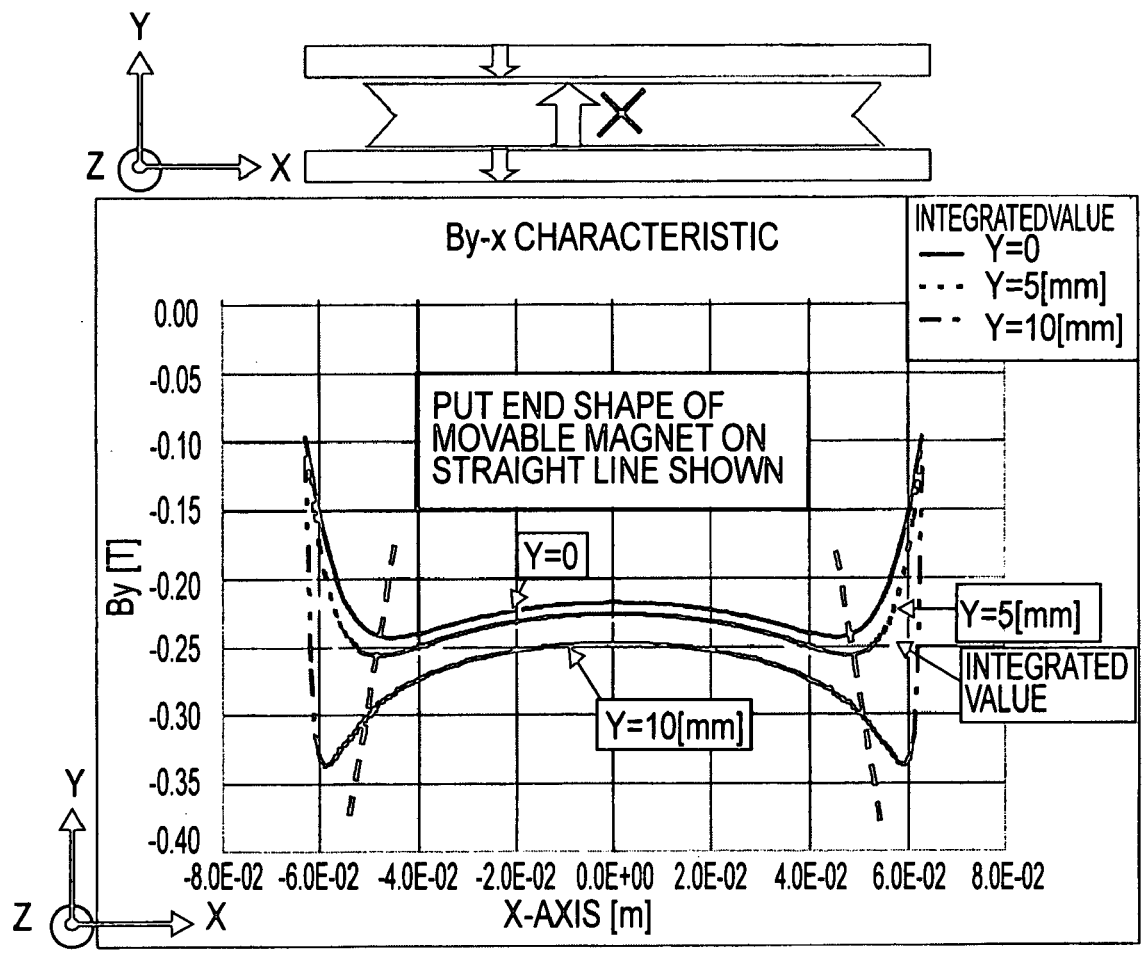
FIG. 16 is an X-Y plan view for explaining the shape of a movable magnet in the fourth embodiment of the present invention.

FIG. 15 shows a magnetic floating device according to a fourth embodiment of the present invention. Denoted at 11 and 12 are fixed magnets, and denoted at 21 is a movable magnet. FIG. 16 is a chart of By-X characteristic produced between the fixed magnets 11 and 12 by these magnets, at Z=0. The end portion of the movable magnet 21 is so shaped that, about the Y-axis origin, it passes through the extreme value position of the By component produced by the fixed magnets 11 and 12 and, at the upper and lower surfaces of the movable magnet 21, it passes inwardly of the extreme value position of the By component produced by the fixed magnets 11 and 12. The X-axis direction force of the magnetic floating device is determined by a value obtainable by integrating the magnetic flux density applied to the movable magnet 21 throughout the whole surface thereof. Hence, the X-axis direction force produced at the movable magnet 21 can be given by equation (1) "Fx=Iz×By*lz". Therefore, if the By component integrated throughout the whole surface of the movable magnet 21 has a symmetry about the extreme value, the lateral shift force in the X-axis direction can be reduced. By shaping the movable magnet as shown in FIG. 15, the By component has better symmetry about the extreme value and, from equation (1), a significant advantageous effect of reduction of lateral shift force in the movable magnet 21 along the X-axis direction is provided.

[Embodiment 5]

Figure 17:
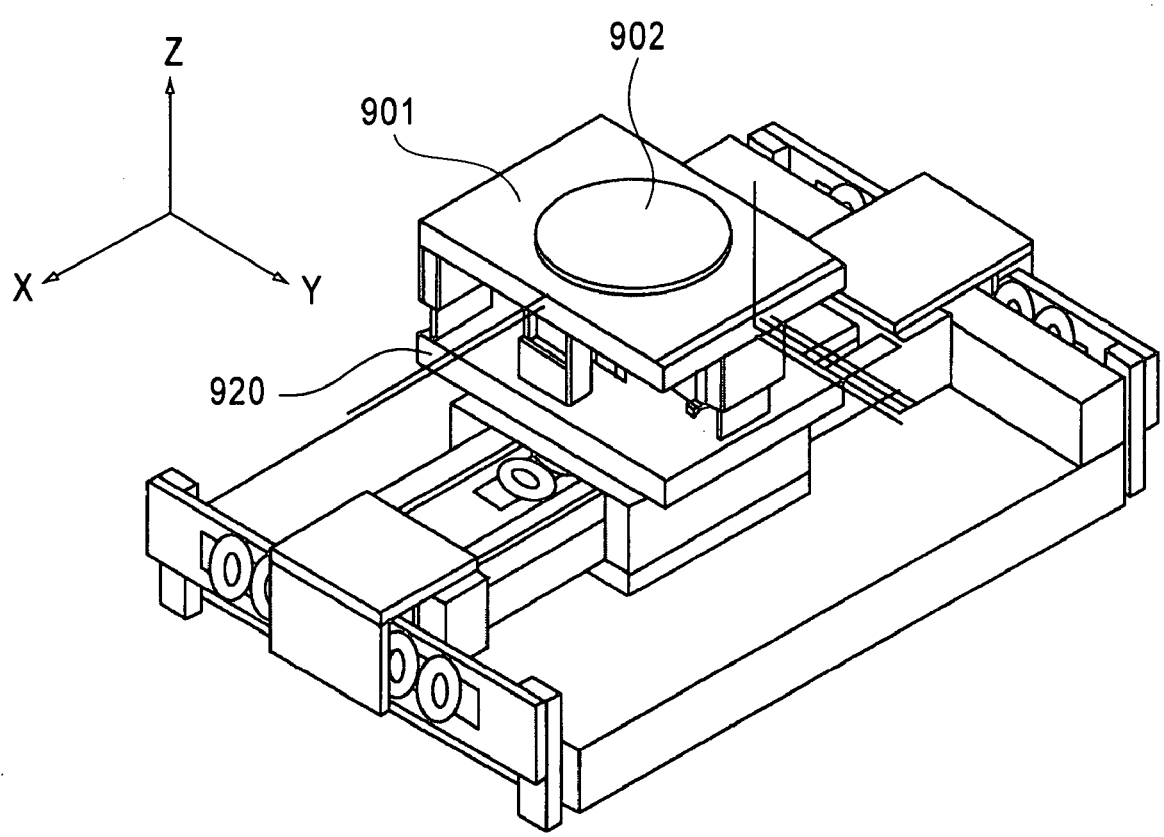
FIG. 17 is a perspective view of an exposure apparatus having a magnetic floating device according to the present invention.
Figure 18:
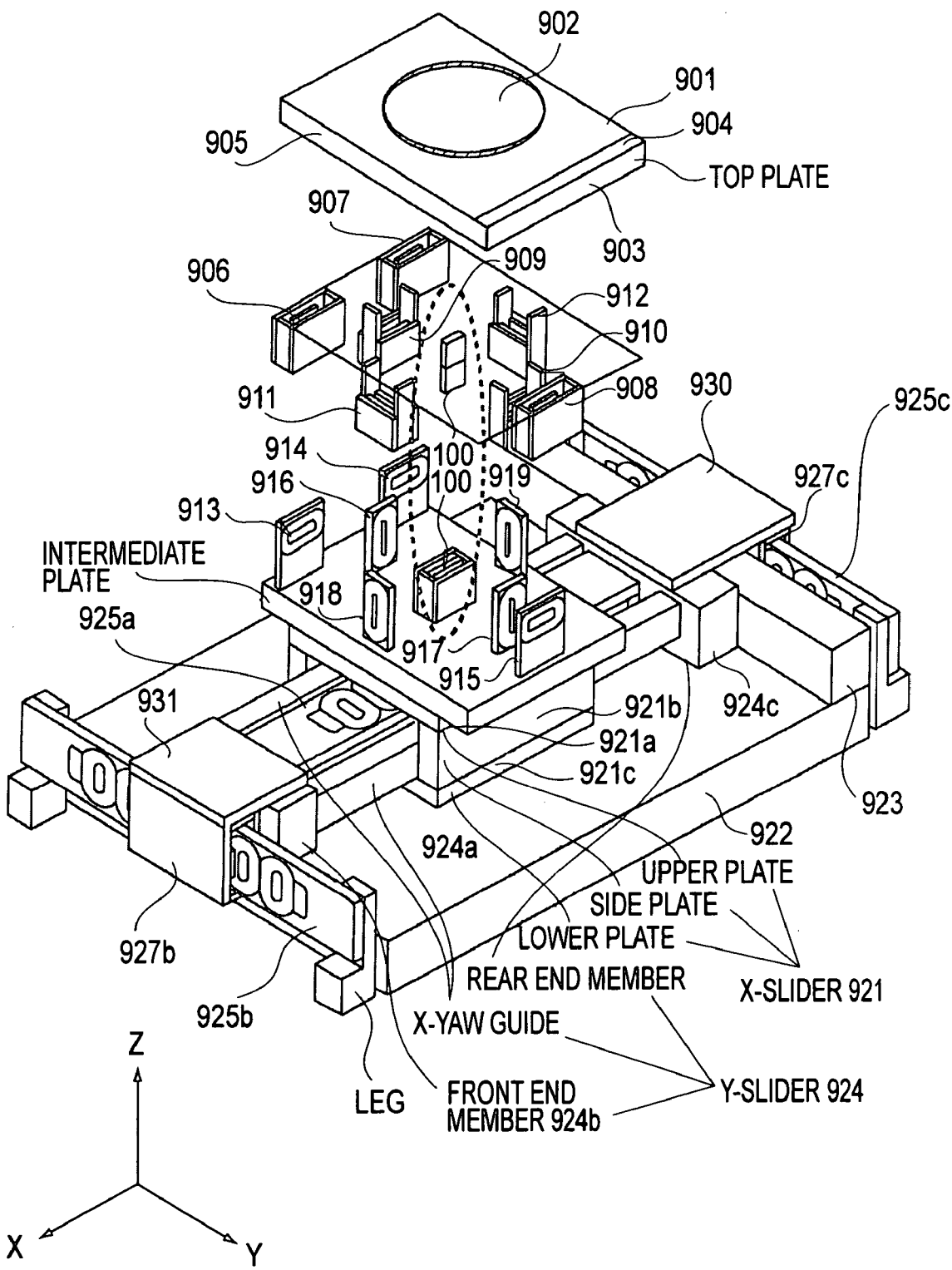
FIG. 18 is an exploded view, showing the structure of a fine-motion stage of a wafer stage of FIG. 17.
Figure 19:
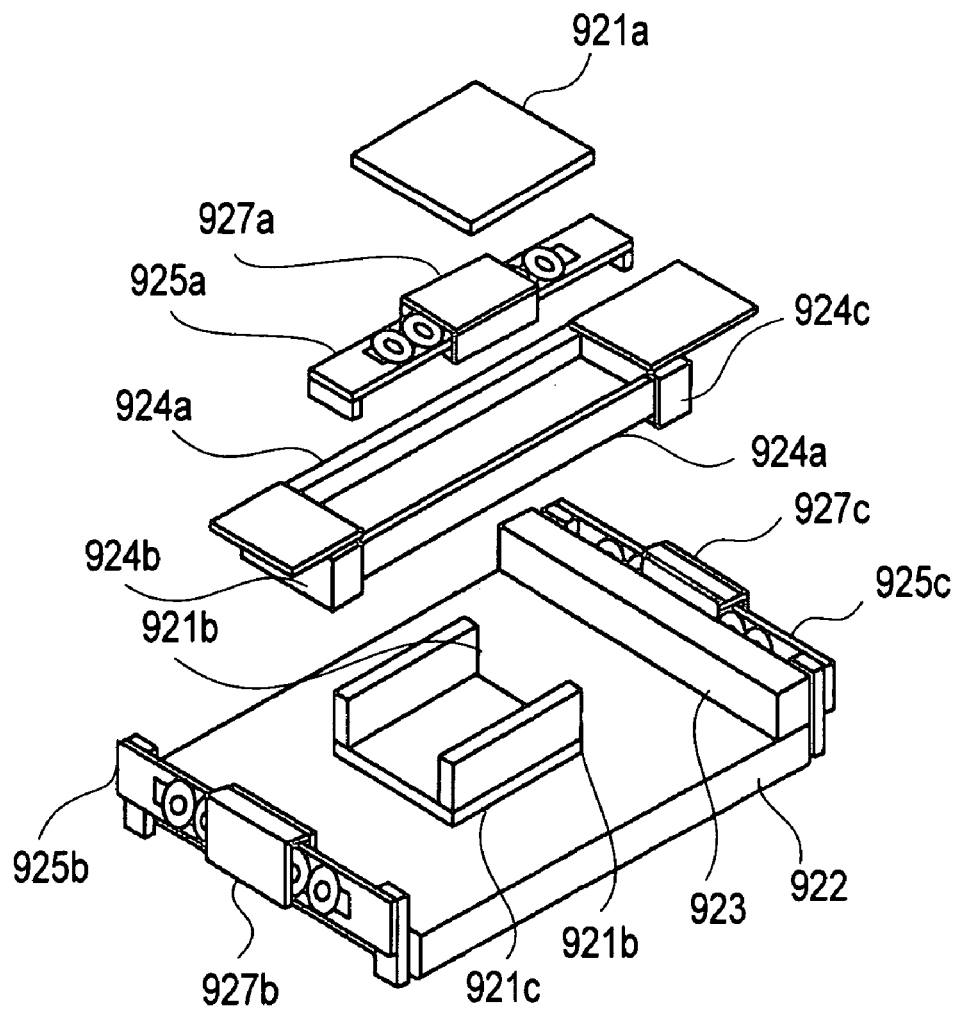
FIG. 19 is a perspective view, showing the structure of a rough-motion stage of the wafer stage of FIG. 17.
Figure 19:
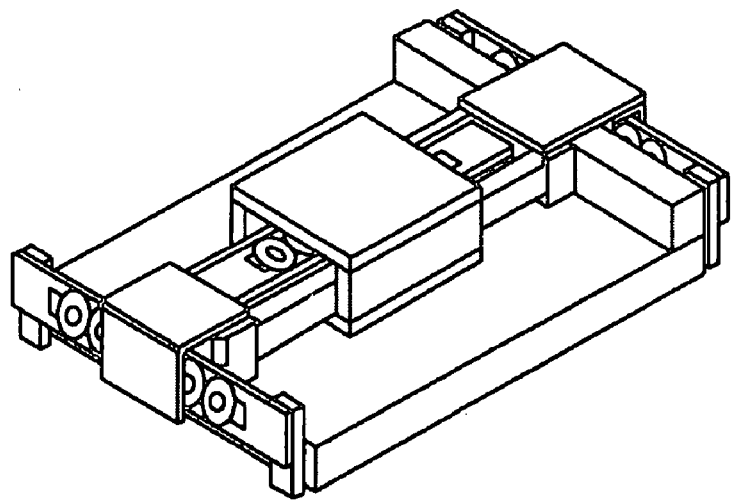
Figure 20:
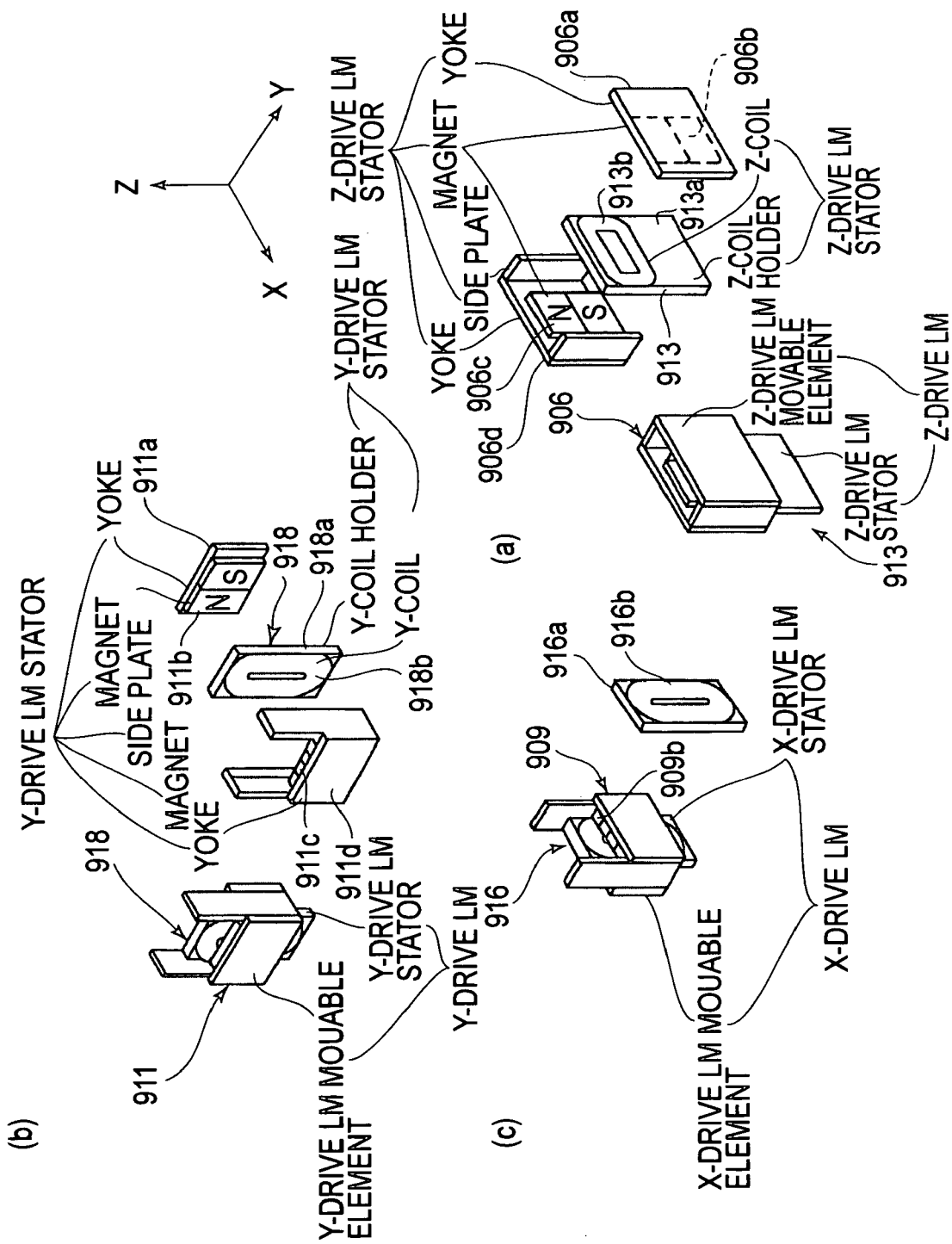
FIG. 20 is a perspective view, showing the structure of a fine-motion stage linear motor used in the wafer stage of FIG. 17.
Figure 21:
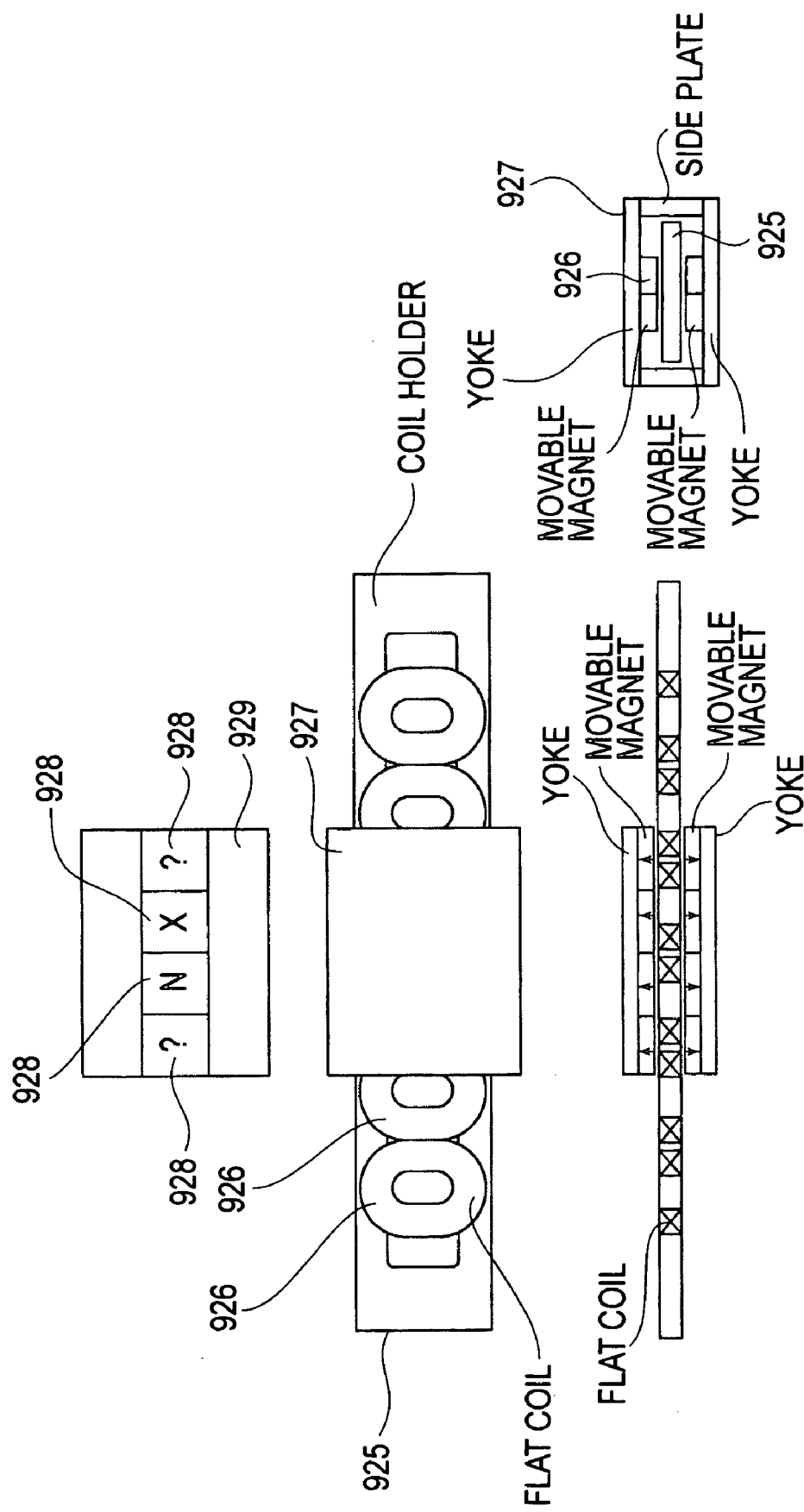
FIG. 21 is a perspective view, showing the structure of a rough-motion stage linear motor used in the wafer stage of FIG. 17.
Figure 22:
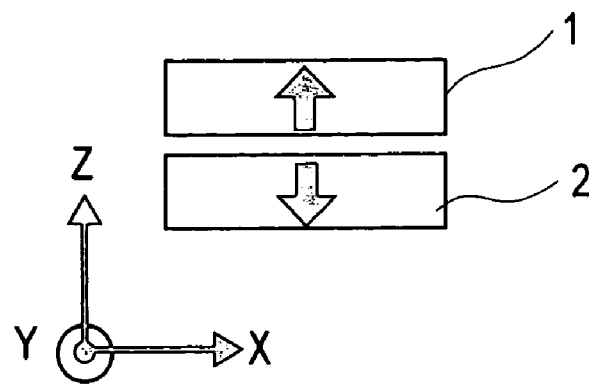
FIG. 22 is an X-Z plan view of a conventional magnetic floating device.

FIG. 17 shows the structure of a wafer stage of an exposure apparatus that uses a magnetic floating device according to a fifth embodiment of the present invention. FIG. 18 illustrates in an exploded view the structure of the wafer stage of FIG. 17, in detail. FIG. 19 shows the structure of a rough-motion stage of the wafer stage of FIG. 17. FIG. 20 shows the structure of a linear motor for a fine-motion stage used in the wafer stage of FIG. 17. FIG. 21 shows the structure of a linear motor for the rough-motion stage of the wafer stage of FIG. 17. The wafer stage generally comprises a rough-motion stage for long-stroke motion in the X- and Y-axis directions, and a fine-motion stage for precise positioning. A top plate of the fine-motion stage is controlled with respect to six-axis directions, directly by means of linear motors.

First, the fine-motion stage will be explained.

A wafer top plate 901 carries thereon a wafer (workpiece) by use of a wafer chuck 902, and it functions to position the wafer with respect to six-freedom directions of X, Y, Z, ωx, ωy and ωz. The wafer top plate 901 has a rectangular plate-like shape, and the wafer chuck 902 is provided at the center thereof, for carrying a wafer thereon.

Mirrors 903, 904 and 905 are provided on the side faces of the wafer top plate 901, for reflecting leaser lights from interferometers to measure the position of the wafer top plate 901. More specifically, total six light beams are projected on the wafer top plate 901 to measure the position of thereof with respect to the six freedoms. By using to interferometer beams being parallel to the X axis and being different with respect to the Z-axis position, the position with respect to the X-axis direction as well as the amount of rotation in the ωy direction can be measured. Further, by using three interferometer beams being parallel to the Y axis and being different with respect to the Z-axis direction position, the position with respect to the Y-axis direction as well as the amounts of rotation in the ωx and ωy directions can be measured. Moreover, by means of a beam which is projected upon a C-surface area (904) of the mirror, the position with respect to the Z-axis direction can be measured. Practically, the measurement positions of these beams are not independent from each other but they interfere with each other. However, through coordinate transformation as a rigid body, values of X, Y, Z, ωx, ωy and ωz at a representative position can be measured.

Mounted on the bottom face of the wafer top plate 901 are seven linear motor movable elements 906–912. As shown in FIG. 20, each movable element comprises two sets of dual-pole magnets (911*b*, 911*c* ; 906*b*, 906*c*) being polarized in its thickness direction and two sets of yokes (911*a*, 911*d*; 906*a*, 906*d*). These two sets of magnets and yokes are connected with each other by means of side plates, to provide a box-like structure. A linear motor stator (918, 913) is then placed inside the box-like structure to be sandwiched by these components, without contact thereto.

Among the seven movable elements, those three movable elements 906–908 which are disposed at the peripheral edge portion of the rectangular top plate function as Z-movable elements. In these Z-movable elements, the dual-pole magnets 906*b* and 906*c* are disposed along the Z direction as shown in portion (a) of FIG. 20. The dual-pole magnets interact with an electric current that flows through a Z-stator elliptic coil 913*b* (to be described later) having a straight portion perpendicular to the Z-direction, to produce a thrust force in Z direction. Hence, these movable elements are named Z1, Z2 and Z2 movable elements (906, 907 and 908), respectively.

The remaining four movable elements 909 –912 are disposed approximately at the center of the rectangular top plate. Two of them function as X-movable elements. In these X-movable elements, as shown in portion (c) of FIG. 20, a dual-pole magnet 909*b* is disposed along the X direction, and it interacts with an electric current flowing through an Z-stator elliptic coil (to be described later) having a straight portion perpendicular to the X direction, to produce a thrust force in the X direction. Hence, these movable elements are named X1 and X2 movable elements (909 and 910).

The remaining two movable elements function as Y-movable elements. In these Y-movable elements, as shown in portion (b) of FIG. 20, dual-pole magnets 911*b* and 911*c* are disposed along the Y direction. They interact with an electric current flowing through a Y-stator elliptic coil (to be described later) having a straight portion perpendicular to the Y direction, to produce a thrust force in the Y direction. Hence, these movable elements are named Y1 and Y2 movable elements (911 and 912).

Disposed above the top of an intermediate plate 920 are stators 913–919 of seven linear motors for position-controlling the wafer top plate 901 with respect to the six-freedom directions, as well as a stator of the magnetic floating device of the present invention for supporting the weight of the wafer top plate 901. The stators 913–919 have a structure for supporting an elliptic coil by means of a peripheral frame, as shown in FIG. 20, and it is arranged to be opposed to the linear motor movable elements 906–912 fixed to the bottom face of the wafer top plate 901, without contact to them. The magnetic floating device 100 is a device that satisfies the requirements of any one of the preceding embodiment.

Among the seven stators, those three stators disposed about the peripheral edge of the X-stage top plate function as X-stators 913, 914 and 915. In these Z-stators, as shown portion (a) of FIG. 20, an elliptic coil 913*b* is disposed with its straight portion placed perpendicularly to the Z direction, such that a thrust force in the Z direction can be applied to the dual-pole magnet of the Z-movable element (906–908) disposed along the Z direction. Hence, these coils are named Z1, Z2 and Z2 coils, respectively.

The remaining four stators are disposed at the central portion of the intermediate plate. Two of them function as X-stators (916 and 917). In these X-stators, as shown in portion (c) of FIG. 20, in the elliptic coil 916*b*, two straight portions are placed perpendicularly to the X direction and two straight portions are placed along the X direction, such that a thrust force in X direction can be applied to the dual-pole magnets of the X-movable elements 909 and 910, disposed along the X direction. Hence, these coils are named X1 and X2 coils, respectively.

The remaining two stators as well are disposed at the central portion of the intermediate plate of rectangular shape, and they function as Y-stators 918 and 919, respectively. In these Y-stators, as shown in portion (b) of FIG. 20, in the elliptic coil 918*b*, two straight portions are placed perpendicularly to the Y direction and two straight portions are placed along the Y direction, such that's a thrust force in the Y direction can be applied to the dual-pole magnet of the Y-movable element, disposed along the Y direction. Hence, these coils are named Y1 and Y2 coils, respectively.

These seven linear motors described above produce a thrust on the basis of Lorentz's' force. Hereinafter, a linear motor that comprises Z-Stator and Z-movable element will be referred to as Z fine-motion linear motor. A linear motor that comprises X-stator and X-movable element will be referred to as X fine-motion linear motor. A linear motor that comprises Y-stator and Y-movable element will be referred to as Y fine-motion linear motor.

At the central portion of the intermediate plate 920, there is a stator of the magnetic floating device arranged in accordance with any one of the first to fourth embodiments described hereinbefore. There is a movable element which is mounted on the bottom face of the wafer top plate 901, and it supports the weight of the wafer top plate 901 on the basis of a magnetic repulsion force of the magnetic floating device 100. Hence, the Z linear motor that comprises Z-movable elements (906–908) and Z-stators (913–915) does not need to produce a thrust force for supporting the self weight of the wafer top plate 901. Only it needs to produce a small force for correcting a deviation from a target position.

Referring to FIGS. 18 and 19, the rough-motion stage will be explained in detail.

The rough-motion stage is disposed below the intermediate plate 920. The intermediate plate 920 is fixed to an upper plate 912*a* of an X-slider 921 of the rough-motion stage. Namely, the rough-motion stage functions to move the intermediate plate 920, which is a base for receiving a reaction force of the linear motor that applies a control force to the wafer top plate 910, through a long stroke in the X and Y directions.

A Y-yaw guide 923 is fixed to a base table 922. A Y-slider 924 which is guided by the side surface of the Y-yaw guide 923 and the top surface of the base table 922, is slidably supported on the base table 922 with respect to the Y direction by means of an air slide (not shown). The Y-slider 924 generally comprises four components such as two X-yaw guides 924*a*, a front end member 924*b*, and a rear end member 924*c*. The rear end member 924*c* is opposed to the top surface of the base table 922 and the side face of the Y-yaw guide 923 through air pads (not shown) provided on the side face and the bottom face thereof. The front end member 924*b* is opposed to the top surface of the base table 922 through air pads provided at the bottom surface thereof. With this structure, the Y-slider as a whole is slidably supported in the Y direction by the side face of the Y-yaw guide 923 and the top surface of the base table 922.

On the other hand, the X-slider 921 is guided by the top surface of the guide table 922 and the side surfaces of the two X-yaw guides 924*a* which are constitutional components of the Y-slider 924, and the X-slider 921 is provided so as to surround the Y-slider 924 around the X axis. The X-slider 921 is slidably supported in the X direction by means of air pads (not shown). The X-slider generally comprises four components such as two X-slider side plates 921*b*, an X-slider upper plate 921*a*, and an X-slider lower plate 921*c*. The X-slider lower plate 921*c* is opposed to the top surface of the base table 922 through air pads (not shown) provided on the bottom surface thereof. The two X-slider side plates 921*b* are opposed to the side faces of the two X-yaw guides 924*a*, which are constitutional components of the Y-slider 924, through air pads (not shown) provided on the side faces thereof. The bottom surface of the X-slider upper plate 921*a* and the top surface of the X-yaw guide 924*a*, as well as the top surface of the X-slider lower plate 921*c* and the bottom surface of the X-yaw guide 924*a*, are placed out of contact with each other. With this structure, the X-slider as a whole is slidably supported by the side faces of the two X-yaw guides 924*a* and the top surface of the base table 922. Thus, consequently, the X-slider 921 is made slidable two-dimensionally along X and Y.

Referring to FIGS. 18, 19 and 21, the driving mechanism will be explained. The driving mechanism include one long-stroke linear motor for X driving (with stator 925*a* and movable element 927*a*) and two long-stroke linear motors for Y driving (with stators 925*b* and 925*c* and movable elements 927*b* and 927*c*), the linear motors being of multiple-phase coil changing type. In each linear motor, as shown in FIG. 21, the stator 925 is provided by arranging plural coils 926 along the stroke direction and inserting then into a frame. The movable element 927 is provided by arranging four-pole magnets, having a magnetic-pole pitch corresponding to the coil span of the coil 926, and placing them upon a yoke plate 929. It is provided as a magnet unit of box-shape having opposed walls, sandwiching the coil 926 therebetween. In this linear motor, by selectively applying an electric current to the coil 926 of the stator 925, a thrust force is produced. This is the structure of an ordinary hollow brushless DC linear motor.

The Y-slider 924 is connected to the movable elements 927*b* and 927*c* through a front mounting plate 931 and a rear mounting plate 930, and it moves with the motion of the movable elements. In the X-slider 921, since the X-slider upper plate 921*a* is connected to the movable element 927*a* (FIG. 19), it moves with the motion of the movable element 927*a*. The X-slider 921 and the Y-slider 924 are provided with measuring means, independent from the fine-motion stage, for measuring the X and Y positions of them.

The function of the rough-motion stage is to receive the reaction force of the linear motors of the fine-motion stage and also to move the intermediate plate constantly to near the target position thereby to prevent that the stroke of the fine-motion stage linear motor is used up. Since the stroke of the fine-motion stage linear motor is about 1 mm, the rough-motion stage does not perform such control for measuring the relative position with the fine-motion stage and following the movement thereof. Instead, it performs the position control independently of the fine-motion stage, by means of separate measuring system.

This control system is superior in the following points. Namely, first, to the fine-motion top plate which is the final control object, forces in six-axis directions are directly from the X, Y and Z fine-motion linear motors. In other words, there is no indirect mechanical transmitting element to the fine-motion top plate. As a result, the control band for the fine-motion top plate can be made higher and, in turn, the position control precision can be made very high. Second, vibration from the floor can be insulated by the X, Y and Z fine-motion linear motors. As described above, the fine-motion liner motors use Lorentz's force, and they do not transmit vibration of the stator to the movable element.

With the structure described above, high-precision scan exposure can be accomplished. Since the lateral shift force of the magnetic floating device 100 is very small, the energies consumed by other external control mechanism such as linear motors can be reduced significantly.

Figure 23:
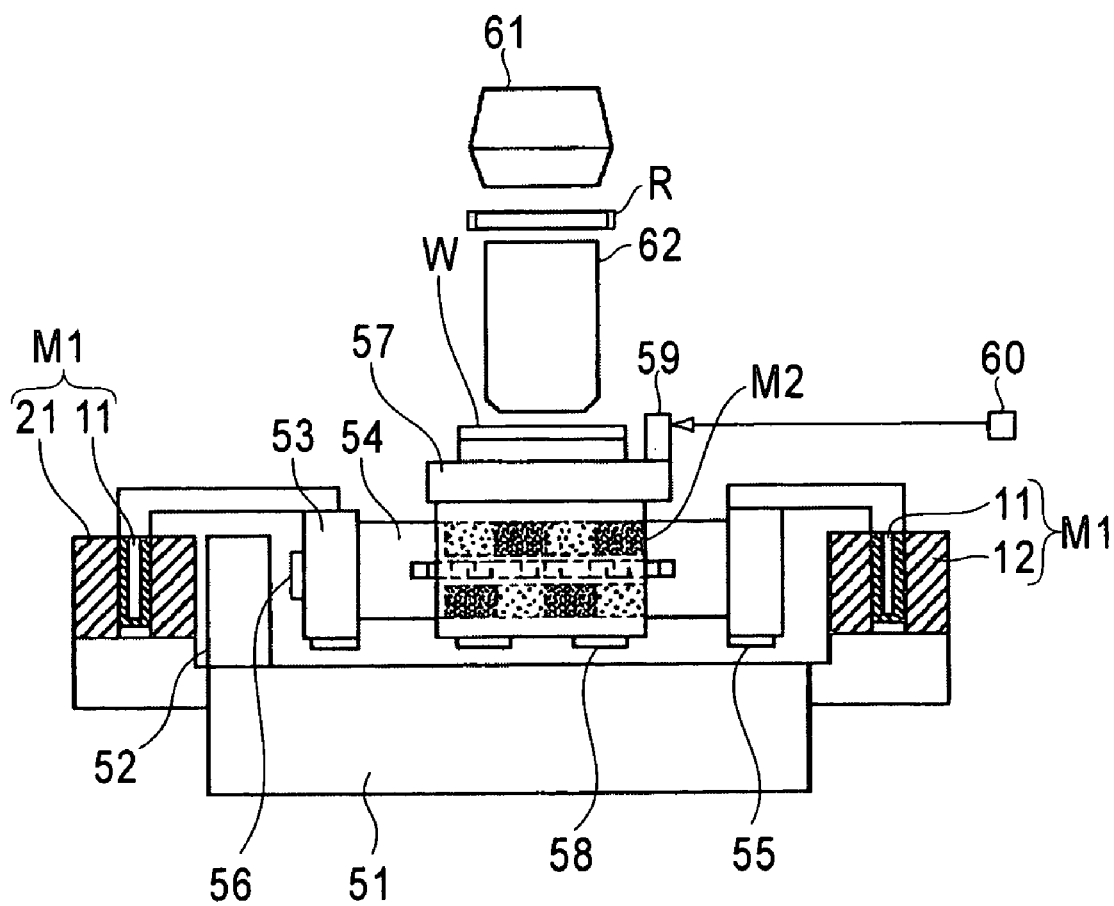
FIG. 23 is a schematic view of an example of exposure apparatus to which the present invention is applied.

FIG. 23 shows an exposure apparatus for semiconductor device manufacture, having a stage mechanism such as described hereinbefore, as a wafer stage.

This exposure apparatus is to be used for manufacture of microdevices having a fine pattern formed thereon, such as semiconductor devices (semiconductor integrated circuits, for example), micromachines, or thin-film magnetic heads, for example. In this exposure apparatus, exposure light (which may include visible light, ultraviolet light, EUV light, X-ray, electron beam, and charged particle beam, for example) as an exposure energy supplied from a light source 61 illuminates a reticle R (original), and light from the reticle R is projected onto a semiconductor wafer W (substrate) through a projection system having a projection lens 62 (which may include refractive lens, reflective lens, catadioptric lens system, and charged particle lens, for example), whereby a desired pattern is produced on the substrate.

The exposure apparatus includes a base table 51 having a guide 52 and a linear motor stator 21 fixed thereto. Similarly to what having been described above, the linear motor stator 21 has a multiple-phase electromagnetic coil, while a linear motor movable element 11 includes a permanent magnet group. The linear motor movable portion 11 is connected as a movable portion 53 to a movable guide 54 (stage), and through the drive of the linear motor M1, the movable guide 54 can be moved in a direction of a normal to the sheet of the drawing. The movable portion 53 is supported by a static bearing 55, taking the upper surface of the base table 51 as a reference, and also by a static bearing 56, taking the side surface of the guide 52 as a reference.

A movable stage 57 which is a stage member disposed to straddle the movable guide 54 is supported by a static bearing 58. This movable stage 57 is driven by a similar linear motor M2, so that the movable stage 57 moves leftwardly and rightwardly as viewed in the drawing, while taking the movable guide 54 as a reference. The motion of the movable stage 57 is measured by means of an interferometer 60 and a mirror 59 which is fixed to the movable stage 59.

A wafer (substrate) W is held on a chuck which is mounted on the movable stage 57, and a pattern of the reticle R is transferred in a reduced scale onto different regions on the wafer W by means of the light source 61 and the projection optical system 62, in accordance with a step-and-repeat method or a step-and-scan method.

It should be noted that the linear motor of the present invention can be similarly applied also to an exposure apparatus in which, without using a mask, a circuit pattern is directly drawn on a semiconductor wafer to expose a resist thereon.

Next, an embodiment of a semiconductor device manufacturing process which uses an exposure apparatus described above, will be explained.

Figure 24:
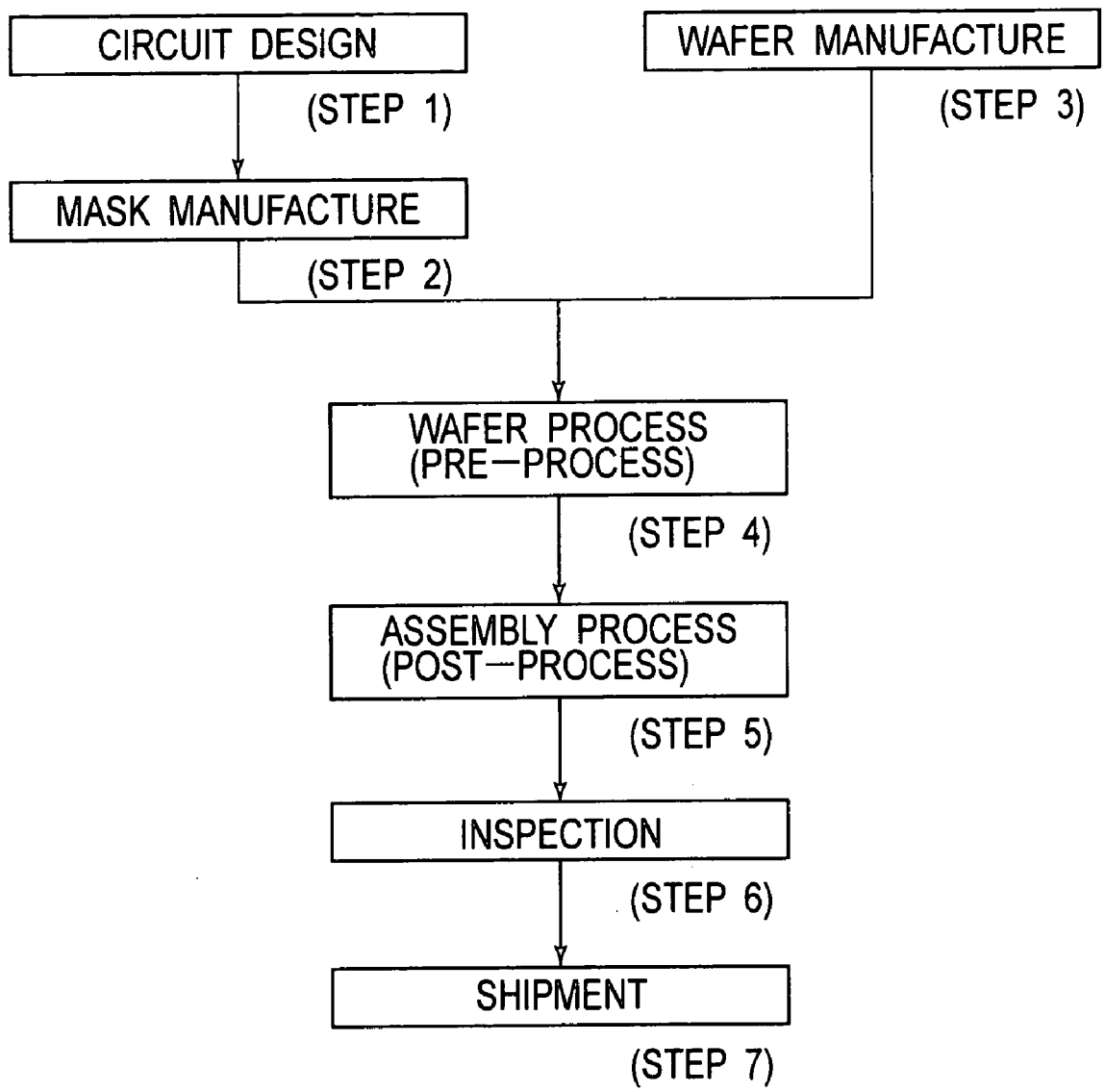
FIG. 24 is a flow chart for explaining device manufacturing processes.

FIG. 24 is a flow chart for explaining the overall procedure for semiconductor manufacture. Step 1 is a design process for designing a circuit of a semiconductor device. Step 2 is a process for making a mask on the basis of the circuit pattern design. Step 3 is a process for preparing a wafer by using a material such as silicon. Step 4 is a wafer process which is called a pre-process wherein, by using the thus prepared mask and wafer, a circuit is formed on the wafer in practice, in accordance with lithography. Step 5 subsequent to this is an assembling step which is called a post-process wherein the wafer having been processed at step 4 is formed into semiconductor chips. This step includes an assembling (dicing and bonding) process and a packaging (chip sealing) process. Step 6 is an inspection step wherein an operation check, a durability check an so on, for the semiconductor devices produced by step 5, are carried out. With these processes, semiconductor devices are produced, and they are shipped (step 7)

More specifically, the wafer process at step 4 described above includes: (i) an oxidation process for oxidizing the surface of a wafer; (ii) a CVD process for forming an insulating film on the wafer surface; (iii) an electrode forming process for forming electrodes upon the wafer by vapor deposition; (iv) an ion implanting process for implanting ions to the wafer; (v) a resist process for applying a resist (photosensitive material) to the wafer; (vi) an exposure process for printing, by exposure, the circuit pattern of the mask on the wafer through the exposure apparatus described above; (vii) a developing process for developing the exposed wafer; (viii) an etching process for removing portions other than the developed resist image; and (ix) a resist separation process for separating the resist material remaining on the wafer after being subjected to the etching process. By repeating these processes, circuit patterns are superposedly formed on the wafer.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2004-011326 filed Jan. 20, 2004, for which is hereby incorporated by reference.

What is claimed is:

1. A magnetic floating device for floating a movable portion relative to a fixed portion, on the basis of a magnetic force, comprising:
   a plurality of first permanent magnets provided on one of the movable portion and the fixed portion; and
   a second permanent magnet provided on the other of the movable portion and the fixed portion, said second magnet being disposed to be sandwiched by the first magnets in the manner that the same magnetic poles are opposed to each other;
   wherein the movable portion and the fixed portion are held relatively movably in a floating direction and in an intersecting direction that intersects with the floating direction and a polarizing direction of the first magnet, and wherein the second magnet is disposed within a range of an extreme value position of a distribution, in the intersecting direction, of a magnetic flux density produced between the first magnets by the first magnets, at an opposing surface of the second magnet being opposed to the first magnet, and
   when Lsx is the size of each of the first magnets in an intersecting direction that intersects with a floating direction and the polarization direction of each of the first magnets, Lsy is the size of each of the first magnets in the polarization direction, Lrx is the size of the second magnet in the intersecting direction, Lry is the size thereof in the polarization direction, and Gd is the spacing between the first magnets, a relation $$Lsx/2 < Lrx < Lsx - (Lsy - Gd - Lry)$$

is satisfied.

2. A magnetic floating device for floating a movable portion relative to a fixed portion, on the basis of a magnetic force, comprising:
   a plurality of first permanent magnets provided on one of the movable portion and the fixed portion; and
   a second permanent magnet provided on the other of the movable portion and the fixed portion, said second magnet being disposed to be sandwiched by the first magnets in the manner that the same magnetic poles are opposed to each other;
   wherein the movable portion and the fixed portion are held relatively movably in a floating direction and in an intersecting direction that intersects with the floating direction and a polarizing direction of the first magnet, and wherein the second magnet is disposed within a range of an extreme value position of a distribution, in the intersecting direction, of a magnetic flux density produced between the first magnets by the first magnets, at an opposing surface of the second magnet being opposed to the first magnet, and
   when Lsx is the size of each of the first magnets in an intersecting direction that intersects with a floating direction and the polarization direction of each of the first magnets, Lsy is, the size of each of the first magnets in the polarization direction, Lrx is the size of the second magnet in the intersecting direction, Lry is the size thereof in the polarization direction, and Gd is the spacing between the first magnets, a relation $$Lsx - (Lsy + Gd) < Lrx < Lsx - (Lsy - Gd - Lry)$$

is satisfied.

* * * * *

UNITED STATES PATENT AND TRADEMARK OFFICE
CERTIFICATE OF CORRECTION

PATENT NO. : 7,211,908 B2  
APPLICATION NO. : 11/038671  
DATED : May 1, 2007  
INVENTOR(S) : Tamaki It is certified that error appears in the above-identified patent and that said Letters Patent is hereby corrected as shown below:

DRAWING SHEET 16:  
Fig. 20. "MOUABLE" (two occurrences) should read -- MOVABLE --.

COLUMN 1:  
Line 37, "force is." should read -- force. --.

COLUMN 2:  
Line 57, "or rectangluar" should read -- of rectangular --; and  
Line 67, "the polar" should read -- the polar- --.

COLUMN 3:  
Line 3, "$Lsx/2<Lrx<Lsx-(lsy-Gd-Lry)$" should read -- $Lsx/2<Lrx<Lsx-(Lsy-Gd-Lry)$ --;  
Line 8, "or rectangular" should read -- of rectangular --;  
Line 27, "or rectangular" should read -- of rectangular --; and  
Line 59, "in un wanted" should read -- in an unwanted --.

COLUMN 6:  
Line 63, "By less changes" should read -- changes less --.

COLUMN 7:  
Line 1, "with larger" should read -- the greater --;  
Line 2, "and 12 is," should read -- and 12, --;  
Line 19, "Values" should read -- values --;  
Line 28, "Value" should read -- value --; and  
Line 55, "less changes" should read -- changes less --.

COLUMN 9:  
Line 9, "μO" should read -- $\mu_0$ --.

COLUMN 11:  
Line 25, "±(lsy+Gd)/2" should read -- ±(Lsy+Gd)/2 --.

COLUMN 12:  
Line 62, Q: "leaser lights" should read -- laser lights --; and  
Line 66, "using to" should read -- using two --.

COLUMN 13:  
Line 36, "Z1, Z2 and Z2" should read -- Z1, Z2 and Z3. --

UNITED STATES PATENT AND TRADEMARK OFFICE
CERTIFICATE OF CORRECTION

PATENT NO. : 7,211,908 B2
APPLICATION NO. : 11/038671
DATED : May 1, 2007
INVENTOR(S) : Tamaki It is certified that error appears in the above-identified patent and that said Letters Patent is hereby corrected as shown below:

COLUMN 14:
Line 11, "Z1, Z2 and Z2" should read -- Z1, Z2 and Z3 --; and
Line 28, "such that's" should read -- such that --.

COLUMN 16:
Line 16, "liner motors" should read -- linear motors --.

COLUMN 18:
Line 50 claim 2, "Lsy is," should read -- Lsy is --.

Signed and Sealed this

Twentieth Day of May, 2008

JON W. DUDAS
*Director of the United States Patent and Trademark Office*